United States Patent
Joshi et al.

(10) Patent No.: US 8,872,850 B2
(45) Date of Patent: Oct. 28, 2014

(54) JUXTAPOSING STILL AND DYNAMIC IMAGERY FOR CLIPLET CREATION

(75) Inventors: Neel Suresh Joshi, Seattle, WA (US);
Sisil Sanjeev Mehta, Atlanta, GA (US);
Michael F. Cohen, Seattle, WA (US);
Steven M. Drucker, Bellevue, WA (US);
Hugues Hoppe, Redmond, WA (US);
Matthieu Uyttendaele, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 298 days.

(21) Appl. No.: 13/411,651

(22) Filed: Mar. 5, 2012

(65) Prior Publication Data

US 2013/0229581 A1 Sep. 5, 2013

(51) Int. Cl.
*G09G 5/377* (2006.01)

(52) U.S. Cl.
USPC .......................................................... 345/629

(58) Field of Classification Search
CPC ...................................... G09G 5/377
USPC ......................................................... 345/629
See application file for complete search history.

(56) References Cited

U.S. PATENT DOCUMENTS

| | | |
|---|---|---|
| 7,336,851 B1 | 2/2008 | Cote |
| 7,383,508 B2 | 6/2008 | Toyama et al. |
| 7,509,321 B2 | 3/2009 | Wong et al. |
| 7,940,329 B2 | 5/2011 | Houmeau et al. |
| 7,979,800 B2 | 7/2011 | Hoshino et al. |
| 2001/0043722 A1* | 11/2001 | Wildes et al. .................. 382/107 |
| 2006/0115116 A1* | 6/2006 | Iwasaki et al. ................. 382/103 |
| 2007/0214417 A1 | 9/2007 | Toyama et al. |
| 2009/0292701 A1 | 11/2009 | Saoudi et al. |
| 2013/0162759 A1* | 6/2013 | Alakarhu et al. ............... 348/36 |
| 2013/0207973 A1* | 8/2013 | Mattila ......................... 345/420 |
| 2013/0272627 A1* | 10/2013 | Chen et al. .................... 382/280 |

OTHER PUBLICATIONS

Dynamosaics: video mosaics with non-chronological time Rav-Acha, A.; Pritch, Y.; Lischinski, D.; Peleg, S. Computer Vision and Pattern Recognition, 2005. CVPR 2005. IEEE Computer Society Conference on Volume: 1 Digital Object Identifier: 10.1109/CVPR.2005.137 Publication Year: 2005 , pp. 58-65 vol. 1.*

(Continued)

*Primary Examiner* — Javid A Amini
(74) *Attorney, Agent, or Firm* — Cassandra Swain; Judy Yee; Micky Minhas

(57) ABSTRACT

Various technologies described herein pertain to juxtaposing still and dynamic imagery to create a cliplet. A first subset of a spatiotemporal volume of pixels in an input video can be set as a static input segment, and the static input segment can be mapped to a background of the cliplet. Further, a second subset of the spatiotemporal volume of pixels in the input video can be set as a dynamic input segment based on a selection of a spatial region, a start time, and an end time within the input video. Moreover, the dynamic input segment can be refined spatially and/or temporally and mapped to an output segment of the cliplet within at least a portion of output frames of the cliplet based on a predefined temporal mapping function, and the output segment can be composited over the background for the output frames of the cliplet.

20 Claims, 16 Drawing Sheets

(56) References Cited

OTHER PUBLICATIONS

Spatiotemporal semantic video segmentation Galmar, E. ; Athanasiadis, T. ; Huet, B. ; Avrithis, Y. Multimedia Signal Processing, 2008 IEEE 10th Workshop on Digital Object Identifier: 10.1109/MMSP.2008.4665143 Publication Year: 2008 , pp. 574-579.*

Efficient extraction of human motion volumes By tracking Niebles, J.C. ; Bohyung Han ; Li Fei-Fei Computer Vision and Pattern Recognition (CVPR), 2010 IEEE Conference on Digital Object Identifier: 10.1109/CVPR.2010.5540152 Publication Year: 2010 , pp. 655-662.*

Video object annotation, navigation, and composition Dan B. Goldman, Chris Gonterman, Brian Curless, David Salesin, Steven M. Seitz Oct. 2008.*

Wallace, et al., "Tools and Applications for Large-Scale Display Walls", Retrieved at <<http://function.princeton.edu/papers/Wallace05-DispWall.pdf>>, Jul. 2005, pp. 24-33.

Schodl, et al., "Video Textures", Retrieved at <<http://research.microsoft.com/pubs/75608/Schodl-SG2000.pdf>>, Proceedings of the 27th annual conference on Computer Graphics and Interactive Techniques (Proceedings of SIGGRAPH 2000), 2000, pp. 489-498.

Kwatra, et al., "Graphcut Textures: Image and Video Synthesis Using Graph Cuts", Retrieved at <<http://www.cc.gatech.edu/cpl/projects/graphcuttextures/gc-final-lowres.pdf>>, ACM Transactions on Graphics (Proceedings of SIGGRAPH 2003), 2003, pp. 277-286.

Agarwala, et al., "Panoramic Video Textures", Retrieved at <<http://grail.cs.washington.edu/projects/panovidtex/panovidtex.pdf>>, ACM Transactions on Graphics (Proceedings of SIGGRAPH 2005), 2005, pp. 1-8.

Rav-Acha, et al., "Dynamosaicing: Mosaicing of Dynamic Scenes", Retrieved at <<http://www.cs.huji.ac.il/~peleg/papers/pami07-dynamosaicing.pdf>>, IEEE Transactions on Pattern Analysis and Machine Intelligence, vol. 29, No. 10, Oct. 2007, pp. 1789-1801.

Tompkin, et al., "Towards Moment Imagery: Automatic Cinemagraphs", Retrieved at <<http://www.cs.ucl.ac.uk/research/vr/Projects/AutoCinemagraphs/autocinemagraphs.pdf>>, Proceedings of the 8th European Conference on Visual Media Production (CVMP), 2011, pp. 1-7.

* cited by examiner

JUXTAPOSING STILL AND DYNAMIC IMAGERY FOR CLIPLET CREATION

BACKGROUND

Visual imagery commonly can be classified as either a static image (e.g., photograph, painting, etc.) or dynamic imagery (e.g., video, animation, etc.). A static image captures a single instant in time. For instance, a static photograph often derives its power by what is implied beyond its spatial and temporal boundaries (e.g., outside the frame and in moments before and after the photograph was taken). Typically, a viewer's imagination can fill in what is left out of the static image (e.g., spatially and/or temporally). In contrast, video loses some of that power, yet by being dynamic, video can provide an unfolding temporal narrative through time.

Another category of visual media that mixes a static image with temporal elements has recently become more prevalent. A classic example is an animated Graphics Interchange Format (GIF), originally created to encode short vector-graphics animations within a still image format. Another common example is simple panning and zooming over large static imagery, sometimes referred to as the Ken Burns effect, which is often used in image slideshows.

A further example of visual media that juxtaposes still and moving images, which has more recently become popular, is referred to as a cinemagraph. Cinemagraphs are usually displayed in the form of an animated GIF. Moreover, cinemagraphs commonly combine static scenes with a small repeating movement (e.g., a hair wisp blowing in the wind); thus, some motion and narrative can be captured in a cinemagraph. In a cinemagraph, the dynamic element is commonly looping in a sequence of frames.

Cinemagraphs are typically created from carefully staged and captured video or a series of photographs using complex, professional image editing tools. These conventional image editing tools, however, are time-consuming to use, and not easily accessible to an untrained user. Moreover, such tools typically do not provide various refinement operations used to overcome inconsistencies and artifacts that commonly arise when juxtaposing still and dynamic imagery.

SUMMARY

Described herein are various technologies that pertain to juxtaposing still and dynamic imagery to create a cliplet. A first subset of a spatiotemporal volume of pixels in an input video can be set as a static input segment. For instance, the static input segment can be a single frame of the input video, a panoramic image stitched from a pan in the input video, a clean plate image with one or more items removed from the input video, or the like. The static input segment can be mapped to a background of the cliplet; thus, the static input segment can be a background image across output frames of the cliplet. Further, a second subset of the spatiotemporal volume of pixels in the input video can be set as a dynamic input segment based on a selection of a spatial region, a start time, and an end time within the input video. The dynamic input segment can be refined spatially and/or temporally. Moreover, the dynamic input segment as refined can be mapped to an output segment of the cliplet within at least a portion of output frames of the cliplet based on a predefined temporal mapping function, and the output segment can be composited over the background for the output frames of the cliplet. Additional dynamic input segment(s) can similarly be set based on respective subsets of the spatiotemporal volume of pixels in the input video, and these dynamic input segment(s) can similarly be refined, mapped to corresponding output segment(s) and composited over the background and the first output segment of the cliplet.

According to various embodiments, a set of predefined temporal mapping functions can be provided. The set can include a still temporal mapping function, a play temporal mapping function, a loop temporal mapping function, and a mirror temporal mapping function. An input segment can be mapped to an output segment using one of the predefined temporal mapping functions from the set. Thus, for instance, a static input segment can be mapped to the background using the still temporal mapping function, while a dynamic input segment can be mapped to an output segment using one of the play temporal mapping function, the loop temporal mapping function, or the mirror temporal mapping function.

In accordance with various embodiments, techniques can be employed to mitigate artifacts in a cliplet by maintaining spatiotemporal continuity in the cliplet composition. Examples of refinement techniques include, but are not limited to, geometric alignment (e.g., global alignment, local alignment), temporal looping optimization and feathering, segmentation, simultaneous matting and compositing, and blending (e.g., Laplacian blending, etc.).

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

DETAILED DESCRIPTION

Figure 1:
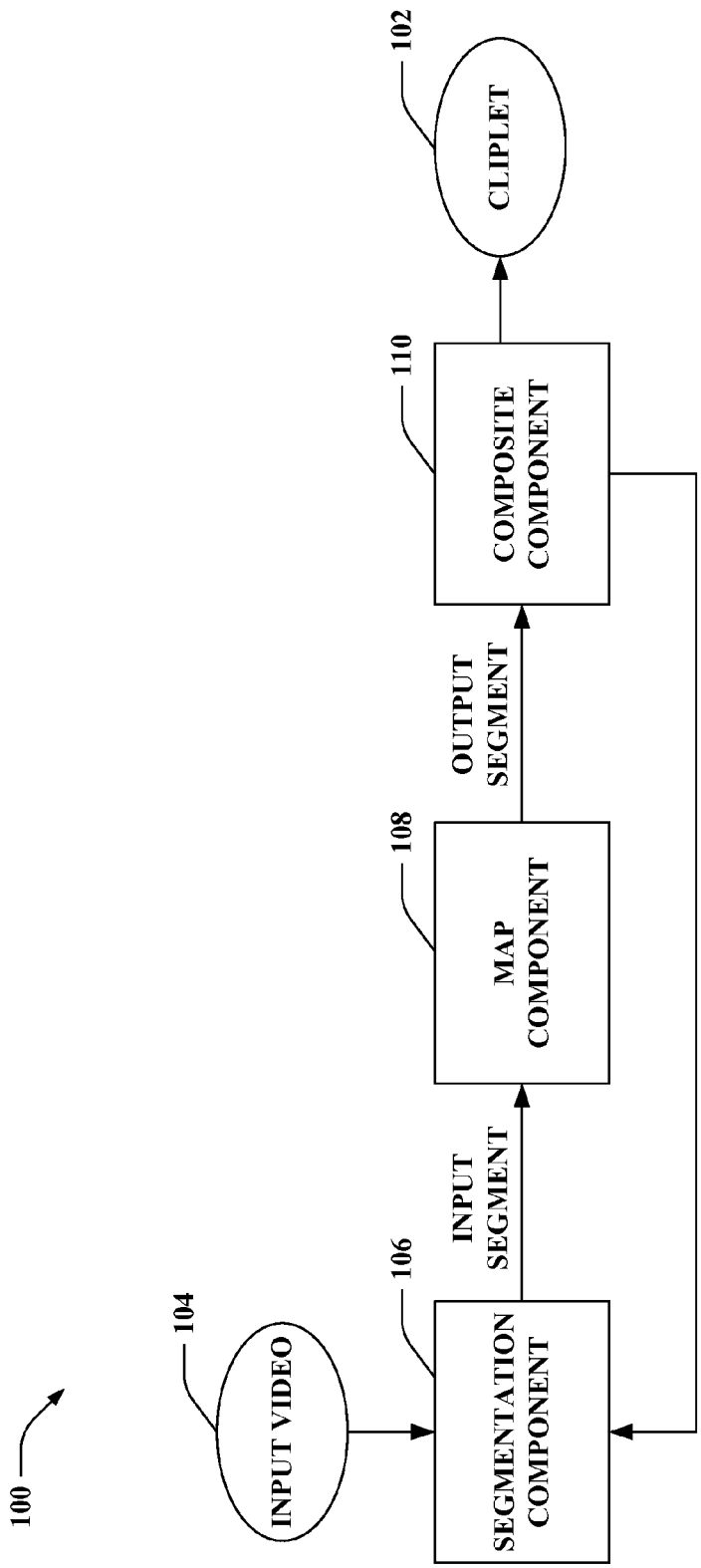
FIG. 1 illustrates a functional block diagram of an exemplary system that generates a cliplet from an input video.

Various technologies pertaining to juxtaposing still and dynamic imagery from input video to generate a cliplet are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects. Further, it is to be understood that functionality that is described as being carried out by certain system components may be performed by multiple components. Similarly, for instance, a component may be configured to perform functionality that is described as being carried out by multiple components.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

As set forth herein, still and dynamic imagery from an input video can be combined to generate a cliplet. A cliplet is a form of visual media that juxtaposes still image and dynamic video segments, both spatially and temporally. A cliplet can expressively abstract a moment. The tension between static and dynamic elements in a cliplet can reinforce both aspects, and can focus a viewer's attention or convey a narrative. More particularly, a set of predefined temporal mapping functions (e.g., paradigms, idioms) are provided herein. The predefined temporal mapping functions can be used to quickly compose a cliplet from input video. The predefined temporal mapping functions can be employed to map segments selected from the input video to output segments that can be composited to create the cliplet. The predefined temporal mapping functions allow a range of cliplets to be created. Moreover, various techniques can be utilized to mitigate seam artifacts by maintaining spatiotemporal continuity in the cliplet composition. Examples of refinement techniques include, but are not limited to, geometric alignment, temporal looping optimization and feathering, segmentation, simultaneous matting and compositing, and blending (e.g., Laplacian blending, etc.).

The term cliplet is used herein to denote media in which dynamic elements are not limited to a looping sequence as is common for cinemagraphs. In addition, the juxtaposition of static and dynamic elements can be spatial (e.g., part of a frame is static while other parts are dynamic), temporal (e.g., a still frame followed in time by a dynamic element, or vice versa), or both.

Referring now to the drawings, FIG. 1 illustrates a system 100 that generates a cliplet 102 from an input video 104. The cliplet 102 $\tilde{V}$ is a three dimensional spatiotemporal object, indexed by time t and two dimensional location x. The input video 104 V is similarly a three dimensional spatiotemporal object, indexed by time t and two dimensional location x. As used herein, tildes denote values in the cliplet 102 and x is overloaded to denote both one dimensional and two dimensional position. The cliplet 102 is formed by composing an ordered set of spatiotemporal output segments $\{\tilde{S}\}$, where each segment $\tilde{S}$ is mapped in time (and optionally space) from a corresponding input segment S within the input video 104. Input and output segments are subsets of the spatiotemporal volume of pixels in the input video 104 and the cliplet 102.

The system 100 includes a segmentation component 106 that sets respective subsets of the spatiotemporal volume of pixels in the input video 104 as input segments S. For example, the respective subsets of the spatiotemporal volume of the pixels can be set based on selections of spatial regions within the input video, start times within the input video, and end times within the input video (e.g., received via a user interface); however, it is to be appreciated that the claimed subject matter is not so limited. Moreover, the system 100 includes a map component 108 that maps the input segments S to output segments $\tilde{S}$. The map component 108 can map each input segment S using a corresponding predefined temporal mapping function selected for that input segment from a set of predefined temporal mapping functions. For example, the set of predefined temporal mapping functions can include at least three of a still temporal mapping function, a play temporal mapping function, a loop temporal mapping function, or a mirror temporal mapping function. By way of another example, the set of predefined temporal mapping functions can include the still temporal mapping function, the play temporal mapping function, the loop temporal mapping function, and the mirror temporal mapping function. Further, the system 100 includes a composite component 110 that composes the cliplet 102 from the output segments $\tilde{S}$.

According to an example, it is contemplated that the input video 104 can be a short video on the order of seconds. For instance, when capturing a photograph, a camera may capture a short video surrounding the photograph; yet, the claimed subject matter is not so limited. The input video 104 can be an informally captured handheld video (e.g., captured by substantially any type of video recording device); yet, the claimed subject matter is not limited to such video. Moreover, the cliplet 102 can be a resulting piece of media that can be digested by a viewer in a short time interval on the order of seconds.

Construction of the cliplet 102 by the system 100 proceeds through creation of a series of intermediate cliplets, $\tilde{V}_1 \ldots, \tilde{V}_K$, by the composite component 110, where K can be substantially any positive integer, culminating in the final result $\tilde{V}$ (e.g., the cliplet 102). Each intermediate cliplet is the result of the composite component 110 composing an output segment generated by the map component 108 with the previous intermediate cliplet. Thus, construction of the cliplet 102 can be represented as follows:

$$0 \xrightarrow{\tilde{S}_1} \tilde{V}_1 \xrightarrow{\tilde{S}_2} \tilde{V}_2 \ldots \xrightarrow{\tilde{S}_K} \tilde{V}_K = \tilde{V}.$$

The first output segment $\tilde{S}_1$ can differ from the other output segments in the set of output segments $\{\tilde{S}\}$. More particularly, the first output segment $\tilde{S}_t$ can fill a spatiotemporal volume of pixels in the cliplet 102, whereas the other output segments can fill a portion of the spatiotemporal volume of pixels in the cliplet 102. According to an example, the segmentation component 106 can set a first subset of a spatiotemporal volume of pixels in the input video 104 as a static input segment from the input video. The segmentation component 106 can set the first subset of the spatiotemporal volume of pixels in the input video as the static input segment based on a selection of a spatial region within the input video 104 and a time (or start time and end time) within the input video 104. The selection can be automatically generated by the segmentation component 106, received by the segmentation component 106 via a user interface based on user input, a combination thereof, or the like. Moreover, the map component 108 can map the static input segment to a background of the cliplet 102 (e.g., the background can be the first output segment $\tilde{S}_1$). For instance, the map component 108 can use a still temporal mapping function for such mapping. As part of the mapping, the background can be repeated across output frames of the cliplet 102. By way of illustration, the first subset of the spatiotemporal volume of pixels in the input video set as the static input segment can include pixels from a single frame of the input video (e.g., at a given time within the input video 104). Pursuant to another illustration, the first subset of the spatiotemporal volume of pixels in the input video can include pixels from more than one frame of the input video 104; for instance, the static input segment can be a panoramic image stitched from a pan in the input video 104. In accordance with a further illustration, the static input segment can be a clean plate image created from the input video 104, where one or more items can be removed from the input video 104 in the resulting clean plate image set as the first subset of the spatiotemporal volume of pixels (e.g., moving items can be removed from the input video 104 in the static input segment, etc.).

Moreover, the segmentation component 106 can set a second subset of the spatiotemporal volume of pixels in the input video 104 as a dynamic input segment from the input video. The segmentation component 106 can set the second subset of the spatiotemporal volume of pixels in the input video as the dynamic input segment based on a selection of a spatial region within the input video 104, a start time within the input video 104, and an end time within the input video 104. Again, the selection can be automatically generated by the segmentation component 106, received by the segmentation component 106 via a user interface based on user input, a combination thereof, or the like. Moreover, the map component 108 can map the dynamic input segment to an output segment of the cliplet 102 (e.g., the output segment can be a second output segment $\tilde{S}_2$) defined within at least a portion of the output frames of the cliplet 102 based on a predefined temporal mapping function. The predefined temporal mapping function can be one of a play temporal mapping function, a loop temporal mapping function, or a mirror temporal mapping function. Moreover, the composite component 110 can composite the output segment over the background for the set of output frames of the cliplet 102. Further, it is contemplated that the foregoing can be repeated for substantially any number of other input segment(s) set by the segmentation component 106.

By way of example, selection of the predefined temporal mapping function can be identified from input received via a user interface. According to another example, the predefined temporal mapping function can be automatically selected. It is also to be appreciated that the map component 108 can map an input segment to an output segment of the cliplet 102 other than the background based on a still temporal mapping function (e.g., the still temporal mapping function is another predefined temporal mapping function provided herein.)

The map component 108 can spatially and temporally map an input segment to an output segment. For instance, a set of predefined temporal mapping functions can be defined to be utilized by the map component 108 for temporally mapping input segments to output segments. Moreover, the spatial mapping from each input segment, S(t,x), to output segment, $\tilde{S}(\tilde{t},\tilde{x})$, performed by the map component 108 can be the identity, for example. In other words, the effect of each segment is to modify some portion of the cliplet 102 by overwriting cliplet pixels in the portion using input pixels from the same positions (e.g., $x=\tilde{x}$), but offset in time.

Moreover, for each segment, the temporal mapping from output time to input time performed by the map component 108 can be defined by some function $t=\phi(\tilde{t})$:

$$\tilde{S}(\tilde{t},\tilde{x})=S(\phi(\tilde{t}),\tilde{x}).$$

The temporal mapping function, $\phi$, characterizes the behavior of a segment and depends on various segment properties. A set of predefined temporal mapping functions are available to the map component 108 to provide expressive power without overly encumbering a user. The set of predefined temporal mapping functions include a still temporal mapping function, a play temporal mapping function, a loop temporal mapping function, and a mirror temporal mapping function.

In the system 100, an output segment can be defined using a set of attributes. More particularly, the set of attributes utilized to define an output segment can include a predefined temporal mapping function to be employed by the map component 108 to temporally map an input segment to the output segment, a spatial region R(t) from the input video 104, a start time $t_s$ within the input video 104, an end time $t_e$ within the input video 104, a playback velocity v relative to an input speed (e.g., default=1), a start time $\tilde{t}_s$ within the cliplet 102, and optionally an end time $\tilde{t}_e$ within the cliplet, otherwise assumed to go on indefinitely.

The system 100 can be at least part of a dedicated interactive tool that allows the cliplet 102 to be easily produced from informally captured handheld input video 104, for example. By way of another example, it is contemplated that the system 100 can be included in a device that captures the input video 104; thus, the system 100 can be configured for execution by a processor of the device that captures the input video 104. Following this example, a camera of a smartphone can capture the input video 104, and a user can employ the smartphone to create the cliplet 102 using the system 100 (e.g., executed by a processor of the smartphone that captured the input video 104).

In accordance with another example, the system 100 can automatically generate a gallery of potential cliplets from the input video 104, where the gallery includes the cliplet 102. The potential cliplets can be differing variations generated from the input video 104. For instance, the gallery of potential cliplets can be created upon providing the input video 104 to the system 100, capturing the input video 104, or the like. Thus, local motion within the input video 104 can be analyzed to generate a set of possible permutations, which can be included in the gallery. Further pursuant to this example, the cliplet 102 can be selected from the gallery of potential cliplets. Yet, it is to be appreciated that the claimed subject matter is not limited to the foregoing example.

Moreover, the cliplet 102 can be encoded as a video. For instance, a video player can be used to display the cliplet 102. According to another example, the cliplet 102 can be embedded in a webpage, document, or substantially any other container.

FIGS. 2-5 illustrate exemplary predefined temporal mapping functions that can be utilized by the map component 108 to temporally map an input segment to an output segment. FIGS. 2-5 depict various predefined temporal mapping functions, graphed using input video time t as a function of output cliplet time $\tilde{t}$. Subscripts s and e refer to start and end times, respectively. It is to be appreciated that these exemplary predefined temporal mapping functions are presented for illustration purposes, and other predefined temporal mapping functions can fall within the scope of the hereto appended claims.

Figure 2:
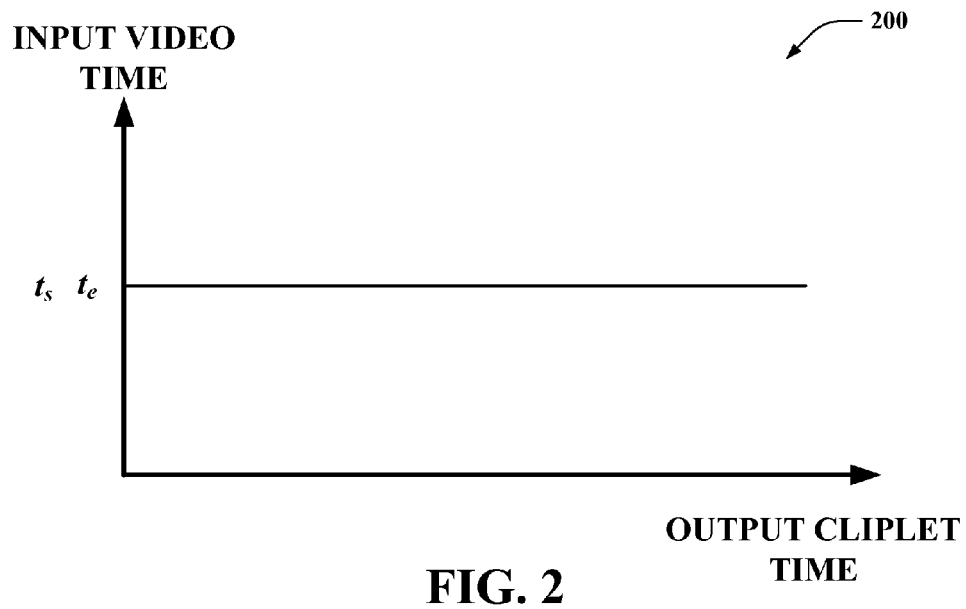
FIGS. 2-5 illustrate exemplary predefined temporal mapping functions that can be utilized to temporally map an input segment to an output segment.

Turning to FIG. 2, illustrated is a still temporal mapping function 200 that can be employed by the map component 108 to temporally map an input segment to an output segment (e.g., a still output segment such as a background). The still temporal mapping function 200 can be represented as $\phi_{Still}(\tilde{t}) = t_s$, where $t_s \le \tilde{t} \le t_e$. The still temporal mapping function 200 freezes a chosen input frame. As shown in FIG. 2, an input segment can temporally include a single frame of the input video (e.g., the start time $t_s$ within the input video and the end time $t_e$ within the input video can be the same time). Spatially, the input segment can cover some or all pixels from the single frame of the input video. The still temporal mapping function 200 repeats the single frame to create an output segment that fills some portion of the spatiotemporal volume of pixels of the cliplet. Typically, a first output segment in a cliplet is a static input segment that spans a full spatial extent of the cliplet, and is mapped over all frames of the cliplet. This initial segment forms a background layer over which additional segments are composed. These additional, more complex segments may include spatial and temporal subregions of the input that are mapped either to play just as in the original video or to repeat a plurality of times (e.g., loop, mirror, etc.).

Figure 3:
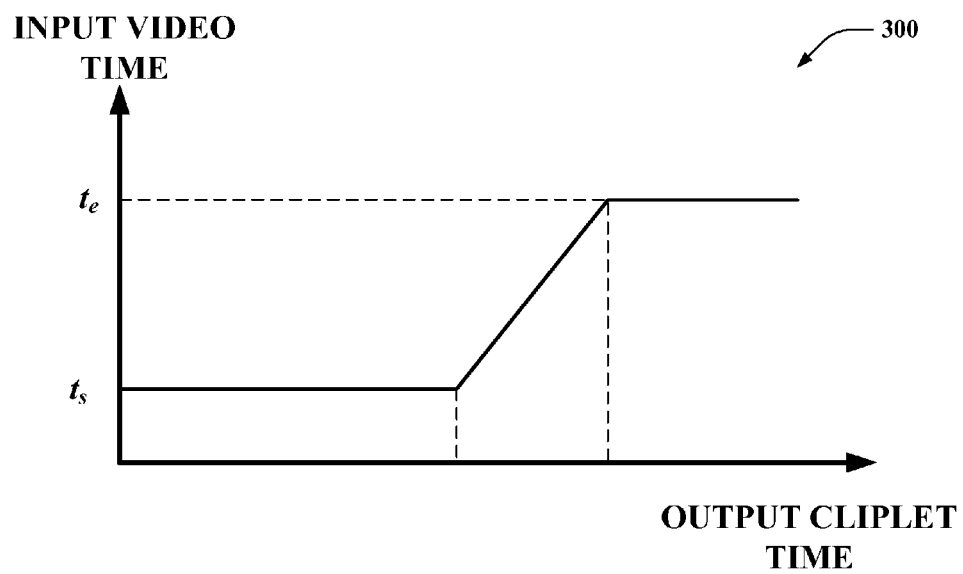

Now referring to FIG. 3, illustrated is a play temporal mapping function 300 that can be utilized by the map component 108 to temporally map an input segment to an output segment (e.g., a play output segment). The play temporal mapping function 300 can be represented as $\phi_{Play}(\tilde{t}) = t_s + v(\tilde{t} - t_s)$, where $t_s \le \tilde{t} \le t_s + (t_e - t_s)/v$.

Figure 4:
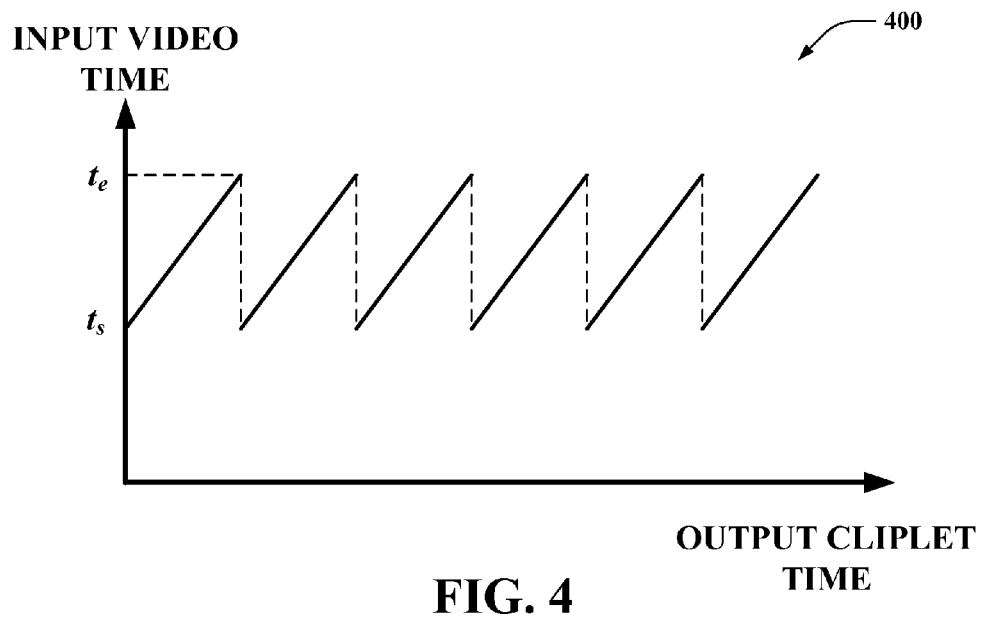

FIG. 4 illustrates a loop temporal mapping function 400 that can be employed by the map component 108 to temporally map an input segment to an output segment (e.g., a loop output segment). As depicted, a snippet of the input video can be repeated multiple times in the output segment. The loop temporal mapping function 400 can be represented as $\phi_{Loop}(\tilde{t}) = t_s + v((\tilde{t} - t_s) \mod T)$, where the loop period $T = (t_e - t_s)/v$.

Figure 5:
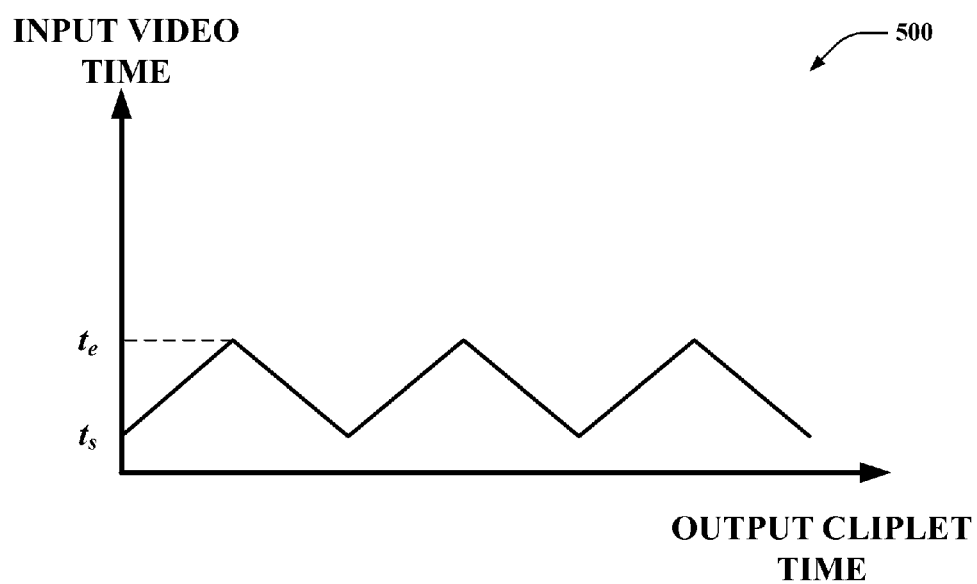

With reference to FIG. 5, illustrated is a mirror temporal mapping function 500 that can be utilized by the map component 108 to temporally map an input segment to an output segment (e.g., a mirror output segment). As depicted, a snippet of the input video can be played successively forwards and backwards in the output segment. The mirror temporal mapping function 500 can be represented as $\phi_{Mirror}(\tilde{t}) = t_s + v \text{ Hat}((\tilde{t} - t_s) \mod 2T)$, where Hat(u) maps time to move forwards for one interval T, and then backwards for another interval T:

$$Hat(u) = \begin{cases} u & \text{if } u \le T, \\ 2T - u & \text{otherwise.} \end{cases}$$

Figure 6:
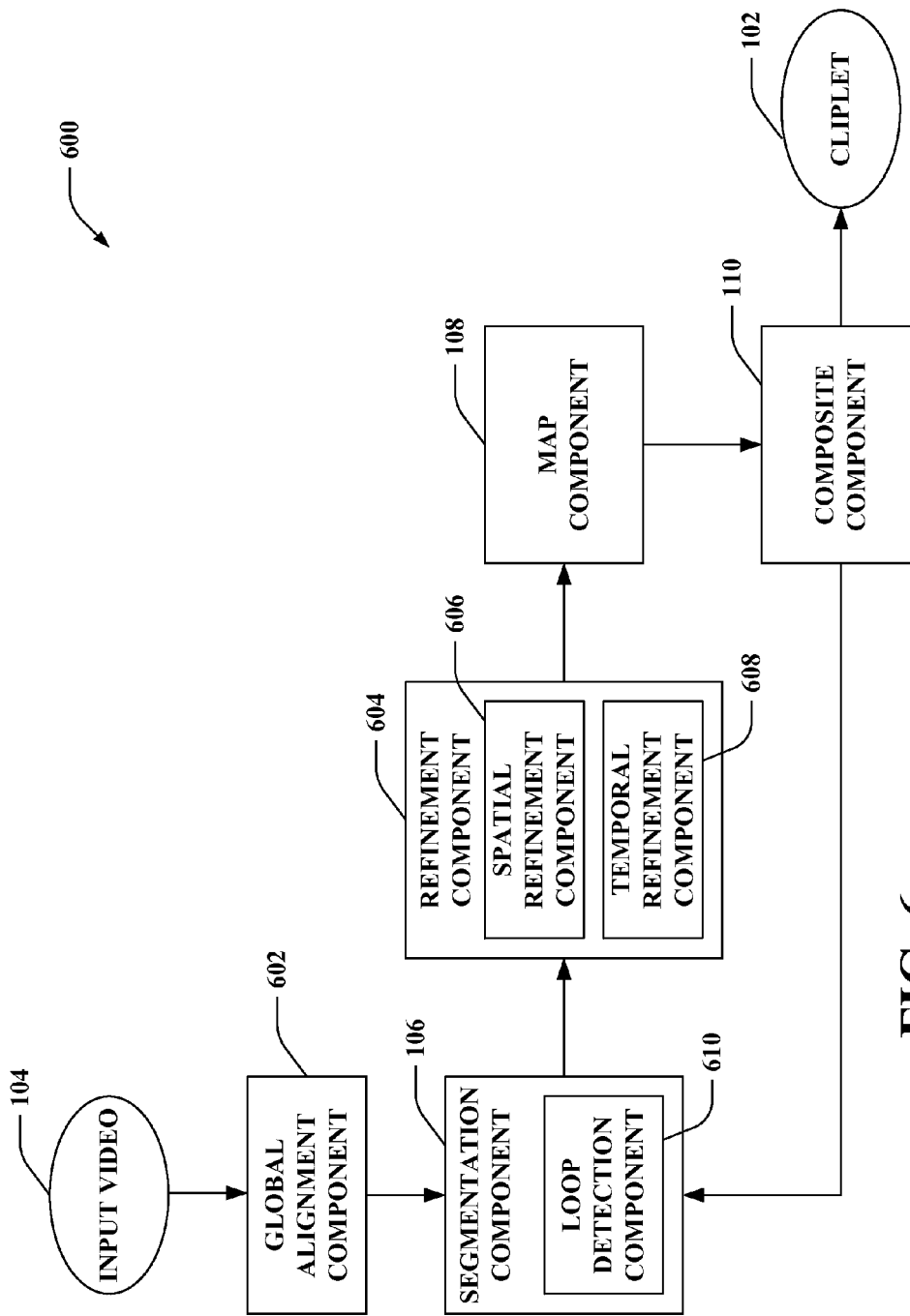
FIG. 6 illustrates a functional block diagram of an exemplary system that employs low-level computer vision techniques to aid juxtaposing still and dynamic imagery to generate the cliplet.

Turning to FIG. 6, illustrated is a system 600 that employs low-level computer vision techniques to aid juxtaposing still and dynamic imagery to generate the cliplet 102. The creation of the cliplet 102 oftentimes can produce a result with artifacts. The artifacts, for instance, can be due to misalignments and other inconsistencies in the input video 104. According to an example, handheld camera shake, as well as scene motion at segment boundaries, may reveal seams between segments. Moreover, changes in scene illumination or camera exposure can also create photometric seams at the boundaries. Further, temporal discontinuities created by the looping structure may reveal temporal seams.

The system 600 can reduce these artifacts by refining mappings between input segments and the output segments. More particularly, the system 600 can improve spatiotemporal continuity using one or a combination of techniques that warp segments both geometrically and temporally, optimize spatiotemporal region segmentation, and/or blend pixel colors at segment boundaries.

Figure 7:
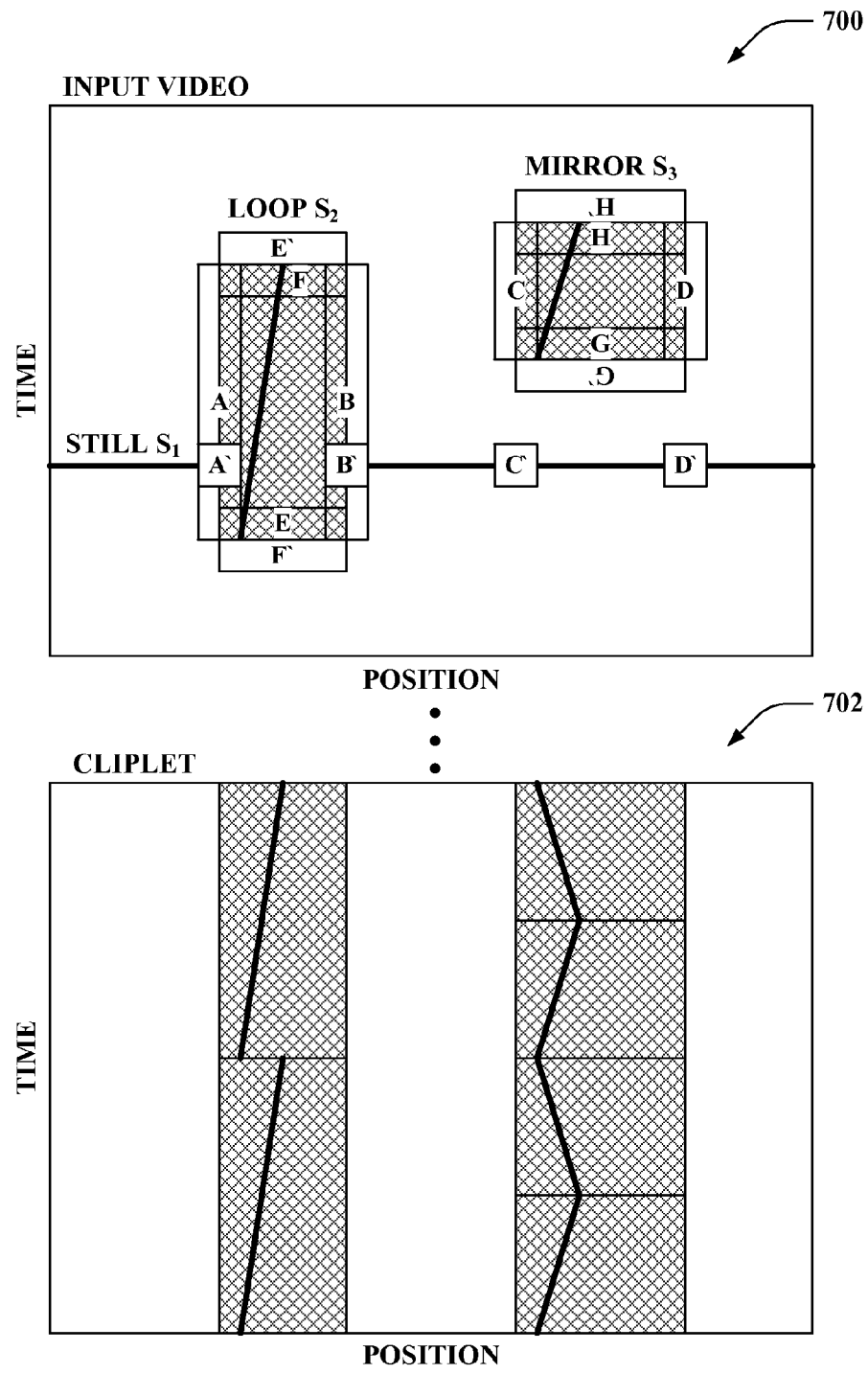
FIG. 7 illustrates exemplary time-versus-position representations of an input video V and an output cliplet $\tilde{V}$ in the presence of three segments (a still segment $S_1$, a loop segment $S_2$, and a mirror segment $S_3$).

Referring to FIG. 7, illustrated are exemplary time-versus-position representations of an input video V 700 (e.g., the input video 104) and an output cliplet $\tilde{V}$ 702 in the presence of three segments (a still segment $S_1$, a loop segment $S_2$, and a mirror segment $S_3$). The three segments access various spatiotemporal regions of the input video V as shown in representation 700. In the output cliplet $\tilde{V}$, similarity of pixel colors in regions A, B, C, and D to pixel colors in regions A', B', C', and D', respectively, can provide for spatial continuity. Moreover, similarity of pixel colors in regions E, F, G, and H to pixel colors in regions E', F', G', and H', respectively, can provide for temporal continuity.

The still segment $S_1$ sources its pixels from a single point in time, but spatially across the whole input video. Small regions of the still, A' and B', abut the loop segment $S_2$. Accordingly, the system 600 of FIG. 6 can implement geometric refinements to match (e.g., make similar) corresponding regions from the spatial boundary of the loop segment, A and B, to A' and B' in the still segment, over the entire time interval $[t_s, t_e]$. Similarly, for the mirror segment $S_3$, the system 600 of FIG. 6 can implement geometric refinements to match (e.g., make similar) C' and D' from the still segment to C and D from the spatial boundary of the mirror segment. Effectively, each pixel near a looping boundary (e.g., of the loop segment or the mirror segment) can have constant color over the loop (e.g., zero optical flow). For example, the source location can be varied over time in the input video V via global and local alignment operators to accommodate the foregoing.

Again reference is made to FIG. 6. The system 600 can modify spatial positions of input pixels to provide geometric refinement. For example, the system 600 can implement global and/or local spatial alignment.

The system 600 can include a global alignment component 602 that pre-processes the input video 104 prior to the segmentation component 106 setting input segment(s). The global alignment component 602 can globally align frames of the input video 104 based on features included in the input video 104.

An example of global alignment performed by the global alignment component 602 is now described. The global alignment component 602 can account for camera motion, which can allow for flexibility to work with input video from a handheld device. As a pre-process, the global alignment component 602 can use a modified video stabilization pipeline to align the video frames of the input video 104 to simulate a still camera. The global alignment component 602 can find a sequence of similarity transforms that, when applied to the input video 104, removes apparent camera motion (e.g., as if the camera had been on a tripod). To accomplish this, for frames in the input video 104, the global alignment component 602 can extract Harris features, each with a corresponding Brief (binary robust independent elementary features) descriptor. Between adjacent frames, the global alignment component 602 can perform a windowed search to find matching features. The window size can be determined by the maximum frame-to-frame velocity that is expected in the input video 104 (or video captured by a particular type of camera). The global alignment component 602 can determine that a feature is a match if the Brief descriptor distance of a match having a highest score is sufficiently different from that of a match having a next highest score (e.g., employ a ratio test). Hence, a set of feature tracks for the input video sequence can be produced.

To avoid locking on to scene motion, the feature tracks are analyzed by the global alignment component 602 to distinguish foreground motion from background static features. The background feature tracks are assumed to belong to the largest set, such that a single temporal sequence of similarity transforms can map background features back to their positions in frame 0. For this, the global alignment component 602 can employ a random sample consensus (RANSAC) technique that runs over the frames of the input video 104 simultaneously. The RANSAC iterations run by picking a random pair of tracks to determine a putative similarity transform T[n, 0] between the last frame (n) and first frame (0) of the sequence. If T[n, 0] maximizes the set of inlier tracks, then that same track pair is used to determine the transform T[i, 0] between every other frame (i) and the first frame. For every frame (i), the global alignment component 602 tests the current inlier tracks with T[i, 0] and removes inliers that are not within a RANSAC threshold. The set of feature tracks that maximizes the inlier count in this multi-frame sense can be declared to be on the background and used to determine the transformations to stabilize the frames to simulate a still camera. While the foregoing provides an example of global alignment that can be effectuated by the global alignment component 602, it is to be appreciated that the claimed subject matter is not so limited and other global alignment techniques are intended to fall within the scope of the hereto appended claims.

Moreover, the system 600 can include a refinement component 604 that can spatially and/or temporally refine an input segment set by the segmentation component 106. The refinement component 604 can further include a spatial refinement component 606 and/or a temporal refinement component 608.

The spatial refinement component 606 can provide local spatial alignment. The spatial refinement component 606 can deform a spatial region of a dynamic input segment (e.g., a mirror segment, a loop segment, a play segment) over time. For instance, the spatial refinement component 606 can deform the spatial region of the dynamic input segment over the time interval from the start time within the input video 104 to the end time within the input video 104 used for determining a subset of the spatiotemporal volume of pixels in the input video 104 set as the dynamic input segment. The spatial refinement component 606 can deform the spatial region to minimize optical flow of pixels in a region along a boundary of the spatial region of the dynamic input segment over the time interval.

Subtle scene motion, scene parallax, or small errors in global alignment can still cause spatial seams in the cliplet 102. For example, the spatial refinement component 606 can reduce this effect as follows. Within an eroded and dilated region near the input segment boundary, R, the spatial refinement component 606 can compute optical flow together with a confidence for the flow values based on local gradient magnitudes. Using a diffusion-based method for sparse data interpolation, these flow vectors can be interpolated, by the spatial refinement component 606, across the input segment weighted according to their confidences values. Yet, it is contemplated that the diffusion-based method is provided as an example, and other techniques are intended to fall within the scope of the hereto appended claims. The spatial refinement component 606 can use the resulting smooth warp field to spatially deform the input segment such that it aligns with the background at the boundaries.

Similar to the spatial discontinuities discussed above, a loop segment, a mirror segment, or a play segment may introduce temporal discontinuities at their temporal boundaries. For instance, as shown in FIG. 7, the loop segment $S_2$ and the mirror segment $S_3$ may introduce temporal discontinuities at their temporal boundaries, indicated as E, F, G, and H. Moreover, the temporal refinement component 608 can mitigate temporal discontinuities of such dynamic input segments.

For example, the temporal refinement component 608 can employ temporal feathering to mitigate temporal discontinuities of a loop segment (e.g., where the predefined temporal mapping function employed by the map component 108 for an input segment is the loop temporal mapping function). Following this example, the temporal refinement component 608 can temporally feather an input segment across frames within a first temporal region that includes the start time within the input video 104 and a second temporal region that includes the end time within the input video 104 using optical flow. Thus, to reduce loop temporal discontinuities, the temporal refinement component 608 can feather (e.g., morph) across the frames near the loop segment endframes.

By way of illustration, durations of the first temporal region and the second temporal region can be preset. In accordance with another illustration, durations of the first temporal region and the second temporal region can be set (or altered) in response to user input received via a user interface. However, it is to be appreciated that the claimed subject matter is not limited to the foregoing illustrations.

Figure 8:
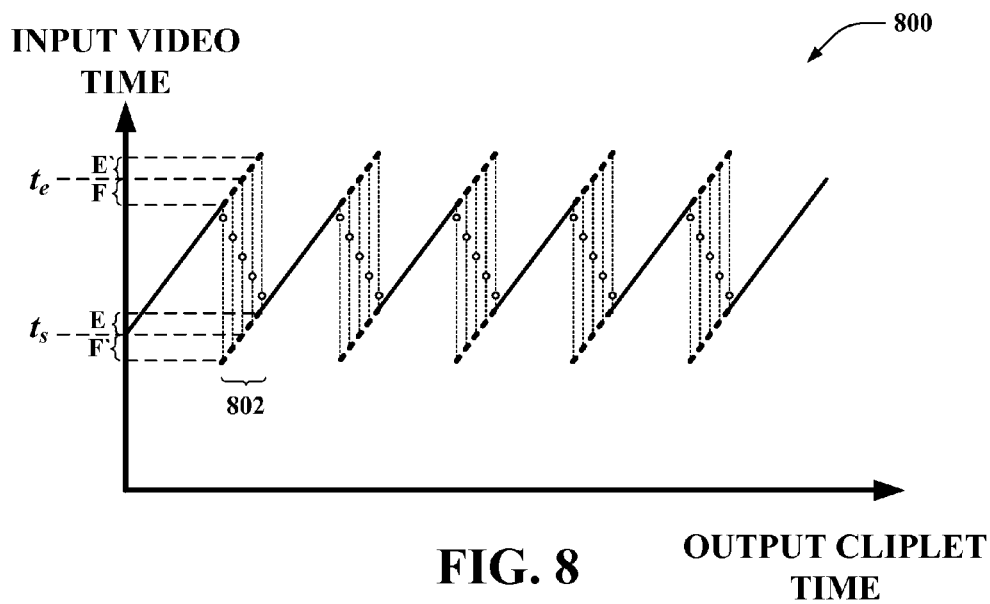
FIG. 8 illustrates an exemplary loop temporal mapping function with temporal feathering, which can be utilized to temporally map an input segment to an output segment.

FIG. 8 illustrates an exemplary loop temporal mapping function 800 with temporal feathering, which can be utilized to temporally map an input segment to an output segment. Over small temporal regions (F', E) and (F, E') (e.g., the first temporal region and the second temporal region), optical flow can be employed to warp E' to fit E, which can generate a result $\overline{E}$. Similarly, a result $\overline{F}$ can be generated to fit F. Moreover, cross-fading between $\overline{F}$ and F and between E and $\overline{E}$ at the loop transition can be performed (e.g., during time period 802, etc.) as illustrated.

Returning to FIG. 6, in accordance with another example, the temporal refinement component 608 can employ slow-in/slow-out temporal mapping to mitigate temporal discontinuities of a mirror segment (e.g., where the predefined temporal mapping function employed by the map component 108 for an input segment is the mirror temporal mapping function). Accordingly, the temporal refinement component 608 can retime an input segment to gradually slow towards the start time within the input video 104 and the end time within the input video 104.

By way of illustration, durations of time from endframes of the input segment that are retimed by the temporal refinement component 608 can be preset. By way of yet another illustration, the durations of time from the endframes of the input segment that are retimed by the temporal refinement component 608 can be set (or adjusted) in response to user input received via a user interface. It is contemplated, however, that the claimed subject matter is not limited to the foregoing illustrations.

Figure 9:
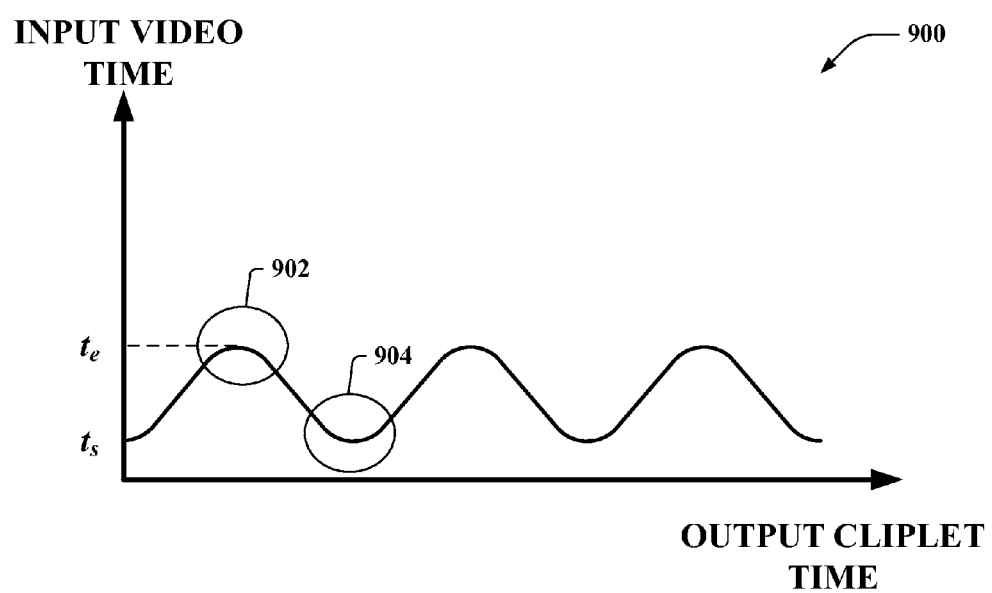
FIG. 9 illustrates an exemplary retimed mirror temporal mapping function that can be employed to temporally map an input segment to an output segment.

FIG. 9 illustrates an exemplary retimed mirror temporal mapping function 900 that can be employed to temporally map an input segment to an output segment. In contrast to the mirror temporal mapping function 500 of FIG. 5, the retimed mirror temporal mapping function 900 can smooth mirror segment endframes (e.g., during time period 902, time period 904, etc.). For instance, for a mirror segment with residual optical flow at a segment endframe, the mirror temporal mapping function 500 of FIG. 5 can result in jerky motion. Such artifact can be reduced by slowing the motion towards segment endframes as depicted in the retimed mirror temporal mapping function of FIG. 9.

Figure 10:
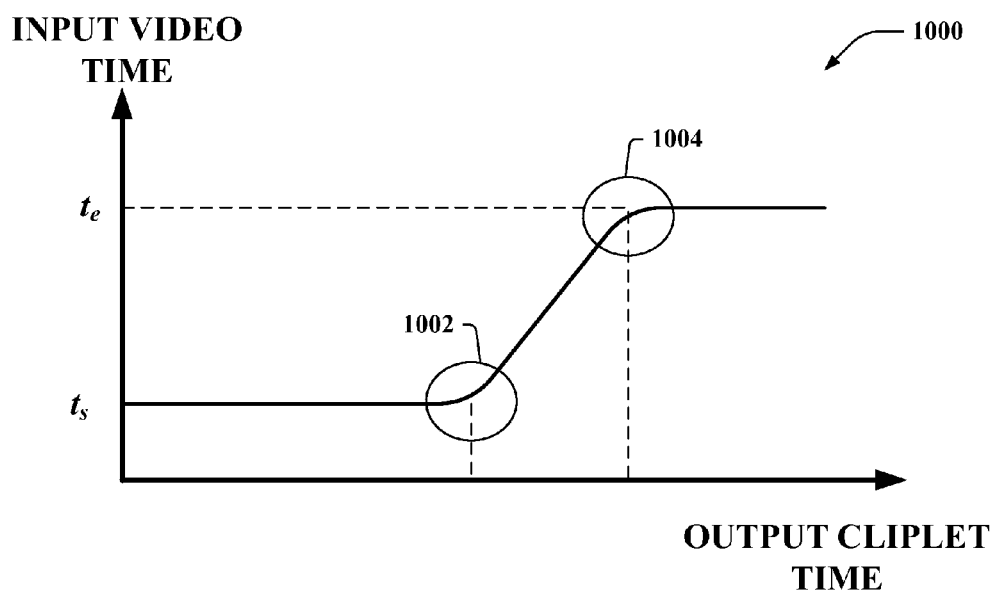
FIG. 10 illustrates an exemplary retimed play temporal mapping function that can be employed to temporally map an input segment to an output segment.

Again, reference is made to FIG. 6. Pursuant to another example, the temporal refinement component 608 can smooth a transition between still and play segments by retiming such transition. FIG. 10 illustrates an exemplary retimed play temporal mapping function 1000 that can be employed to temporally map an input segment to an output segment. As depicted, the transitions (e.g., during time period 1002 and time period 1004) between still and play segments can be retimed.

Turing back to FIG. 6, retiming of the transition between still and play segments can be similar to the retiming for a mirror segment. For instance, the temporal refinement component 608 can generate new in-between frames because time is momentarily slowed (e.g., as part of either retiming). Moreover, the temporal refinement component 608 can use optical flow to flow frames forwards and backwards, and results can be interpolated when a frame rate drops below a threshold (e.g., below 10 frames per second (fps), etc.).

Moreover, the system 600 can perform loop finding to provide temporal refinement. The segmentation component 106 can include a loop detection component 610 that detects frames (e.g., the start time within the input video 104 and the end time within the input video 104) for loop segments, mirror segments, and/or play segments.

According to an example, the loop detection component 610 can perform loop finding for loop segments (e.g., when the predefined temporal mapping function employed by the map component 108 is the loop temporal mapping function). Following this example, the loop detection component 610 can detect a pair of frames from the input video 104 where differences in pixel color and optical flow in the spatial region (e.g., where the input segment is set in part based on the spatial region) between the pair of frames are minimized. Thus, differences in pixel color and optical flow can be evaluated between portions of frame pairs (e.g., within the spatial region from the frame pairs) as opposed to between full frame pairs. Moreover, the pair of frames can be suggested as the start time within the input video 104 and the end time within the input video 104. Additionally or alternatively, the pair of frames can be automatically selected as the start time within the input video 104 and the end time within the input video 104.

Hence, for loop segments, it can be desired that frames just before and after the start and end frames be as similar as possible. Thus, temporal artifacts are minimized if the temporal region E in FIG. 7 matches the temporal region E' just beyond the end of the segment and likewise if the temporal region F matches the temporal region F'. Effectively, the endframes of the loop can be similar in both pixel colors and optical flow. To achieve this, the loop detection component 610 seeks start and end time pairs that minimize these differences. The user can let the loop detection component 610 search the entire input video 104 for the best candidate loops, or can specify an initial segment and have the loop detection component 610 search nearby for improved start and end times.

By way of another example, the loop detection component 610 can perform loop finding for mirror segments (e.g., when the predefined temporal mapping function employed by the map component 108 is the mirror temporal mapping function). Pursuant to this example, the loop detection component 610 can detect a first frame and a second frame from the input video 104 where differences in optical flow in the spatial region (e.g., which sets the input segment) between the first frame and frames temporally adjacent to the first frame and between the second frame and frames temporally adjacent to the second frame, respectively, are minimized. Further, the first frame and the second frame can be suggested as the start time within the input video 104 and the end time within the input video. Additionally or alternatively, the first frame and the second frame can be automatically selected as the start time within the input video 104 and the end time within the input video 104.

Thus, for mirror segments, the situation differs from loop segments. In the case of mirror segments, it is desired that the small temporal regions around the start and end, G and H in FIG. 7, match their temporally inverted regions just beyond the temporal boundaries, G' and H'. This can be true if the endframes have zero optical flow. Accordingly, the loop detection component 610 can search for frames with little optical flow within the segment region. As with loop segments, the loop detection component 610 can automatically present candidates near those specified, or the top set of candidates from the full input video 104.

According to another example, the spatial refinement component 606 can effectuate segment boundary refinement. To keep the user interface simple, a user can sketch a single spatial region R for each segment at one selected time frame (e.g., the selection of the spatial region). Thus, the segment's spatiotemporal extent $\tilde{S}_i$ is a generalized cylinder, and the extrusion of the user-drawn region R over a fixed time interval $[t_s, t_e]$ can be obtained.

Often the user-defined boundary may not be ideal. The user may not completely encircle an object, or in subsequent frames, objects with significant motion may leave the boundary and/or unwanted objects may enter. In these cases, to improve spatiotemporal continuity, the spatial refinement component 606 can refine the extent $\tilde{S}_i$ in two ways. First, the spatial refinement component 606 can compute optical flow between frames to advect the user-drawn boundary R to form a time-dependent region R(t). Second, the spatial refinement component 606 can perform a binary graph-cut over the spatiotemporal volume to refine the segment boundary (e.g., similar to graphcut textures). The foregoing can leverage the observation in simultaneous matting and compositing that, since both the segment and the background come from the same source material, a conservative matte that does not cut through the foreground tends to avoid artifacts.

The optimization can be governed by a trimap computed by the spatial refinement component 606 from erosion and dilation on the region R(t). Pixels between (and including) the two trimap boundaries are assigned nodes in the graph-cut formulation. A binary cut can determine if the pixel is assigned to the new segment $\tilde{S}_i$ or retains its value from the previous cliplet $\tilde{V}_{i-1}$. In the simplest case, where there is one segment overlaying the reference image, the assignment is between using the pixel in the new segment versus the reference image. To enforce the boundary conditions of the trimap, edge costs between the trimap boundary nodes and the source or sink can be established to force the outer boundary to be assigned to the background and the inner boundary to be assigned to the foreground segment.

Each node corresponding to the inner region of the trimap is connected with a pair of directed edges to each of its six adjacent spatiotemporal pixels. These edges are assigned costs according to spatiotemporal continuity energy. Specifically, if $p=(t,x)$ denotes a spatiotemporal pixel and $p+\delta$ is its spatially or temporally adjacent neighbor, the cost for the directed edge $(p, p+\delta)$ is $\|N(\tilde{S}(p))-N(\tilde{V}(p))\|^2+\|N(\tilde{S}(p+\delta))-N(\tilde{V}(p+\delta))\|^2$. Here, N denotes a small spatial neighborhood weighted by a windowed Gaussian with $\sigma=2$. The result of the graph-cut solution is a modified spatiotemporal extent $\tilde{S}_i$ whose boundaries adapt to both the source video content and the intermediate cliplet over which it is composed.

According to a further example, the composite component 110 can spatially blend (e.g., during composition) output segment(s) and a background generated by the map component 108. To reduce remaining spatial discontinuities, the composite component 110 can perform per-frame Laplacian blending when compositing each segment, for example. By way of another example, the composite component 110 can perform blending in a gradient domain. However, substantially any other type of blending can be performed by the composite component 110 and is intended to fall within the scope of the hereto appended claims. Such blending performed by the composite component 110 can reduce artifacts due to changes in exposure times as well as small misalignments.

In accordance with various examples, the system 600 can support deferred rendering of full frames of the cliplet 102 until display time. For instance, the cliplet 102 can be represented by storing constituent segments rather than a traditional video loop. Although a representation that maintains explicit segments may use customized playback code, it can offer benefits such as being more concise than a video loop and allowing stochastic variability (e.g., as in video textures). Yet, it is to be appreciated that the claimed subject matter is not so limited.

FIGS. 11-16 illustrate frames from an exemplary cliplet that can be created using techniques described herein. More particularly, six frames (e.g., frame 1100, frame 1200, frame 1300, frame 1400, frame 1500, and frame 1600, collectively referred to as frames 1100-1600) from the exemplary cliplet are depicted. Moreover, the frames 1100-1600 are in temporal order (e.g., the frame 1100 is before the frame 1200, the frame 1200 is before the frame 1300, etc. along an output cliplet timeline). It is to be appreciated, however, that the exemplary cliplet depicted in FIGS. 11-16 is provided for illustration purposes, and the claimed subject matter is not limited to such example.

Figure 11:
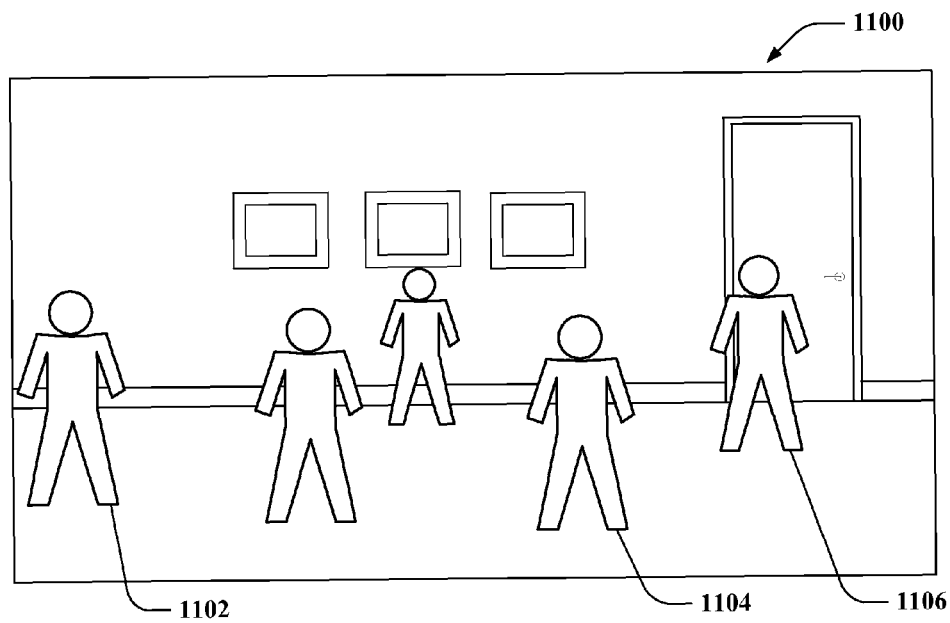
FIGS. 11-16 illustrate frames from an exemplary cliplet that can be created using techniques described herein.
Figure 12:
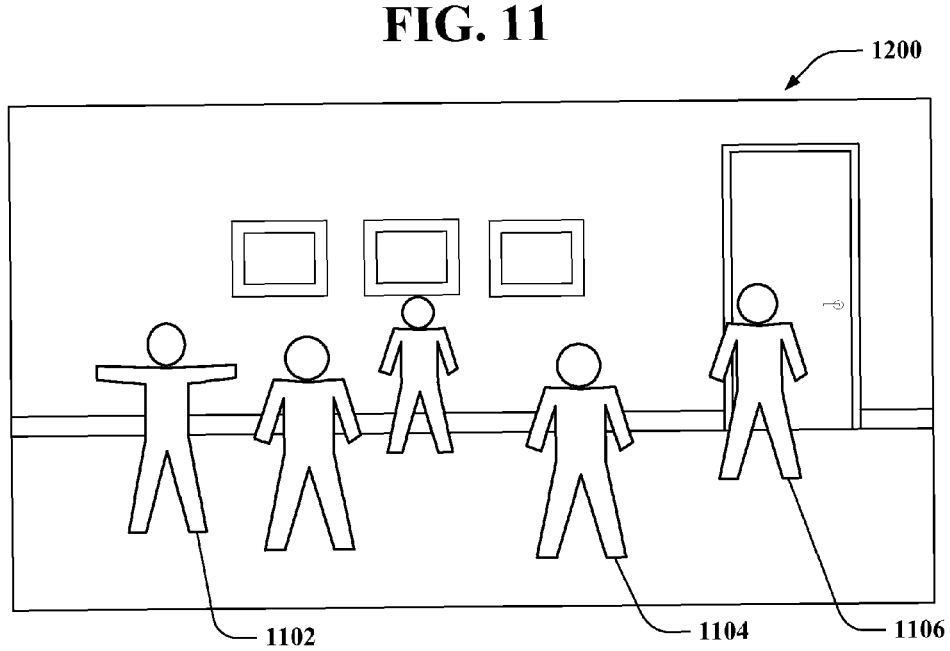
Figure 13:
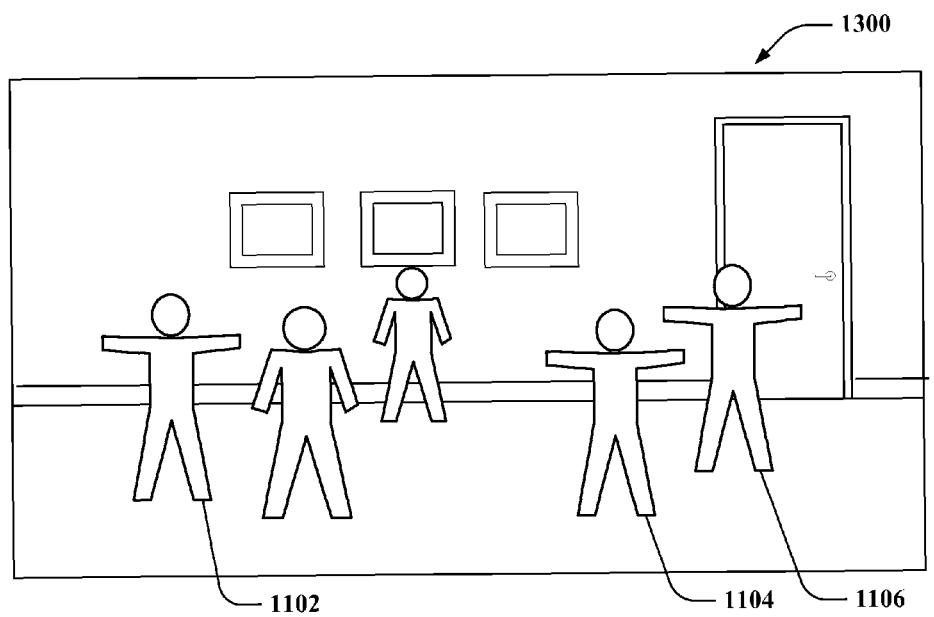
Figure 14:
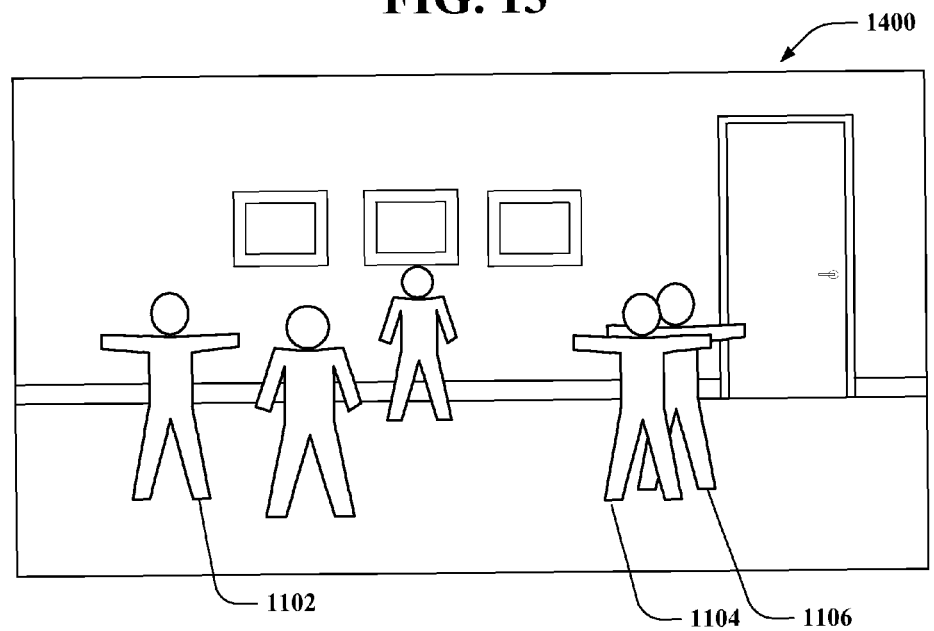
Figure 15:
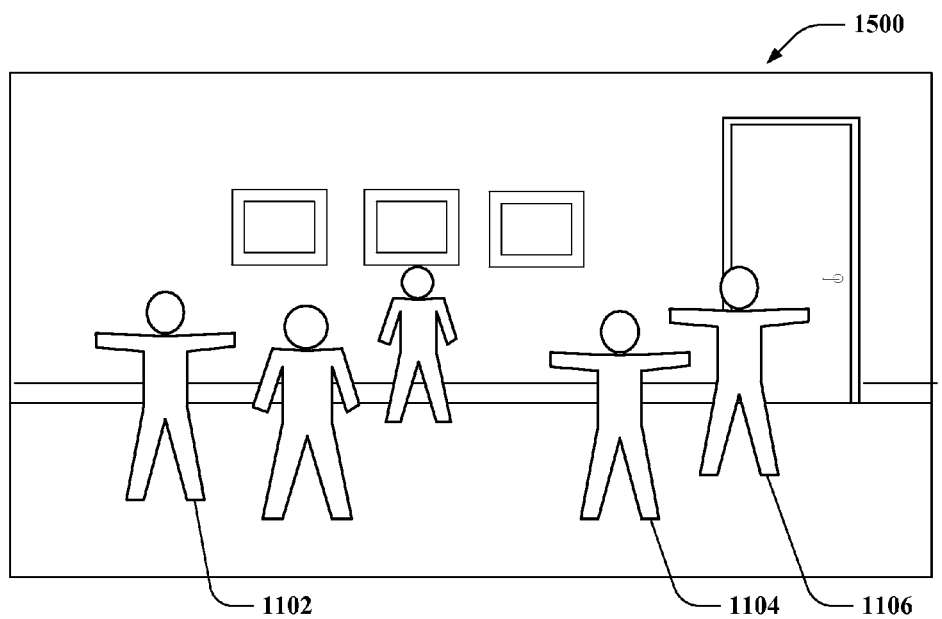
Figure 16:
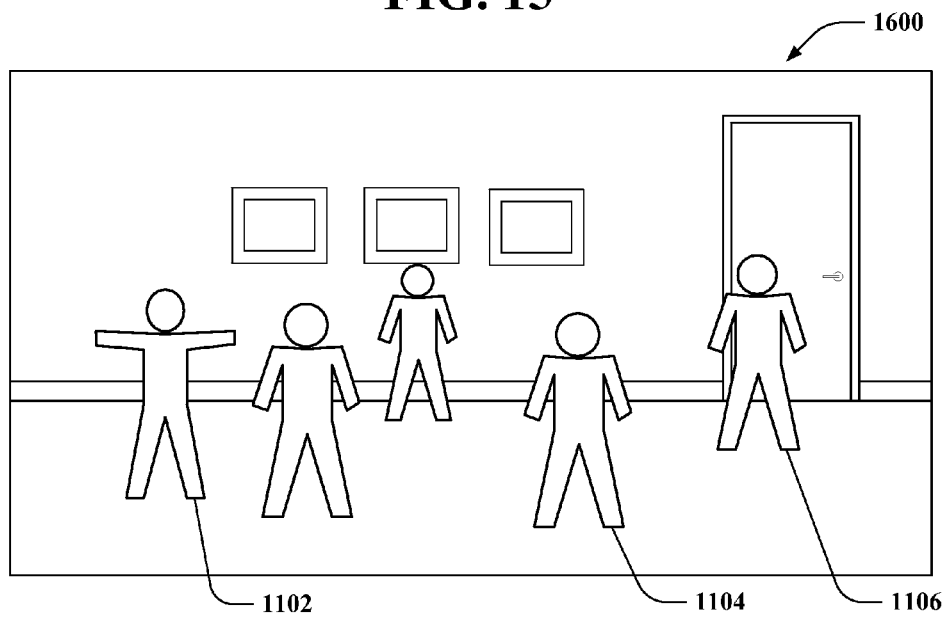

The exemplary cliplet of FIGS. 11-16 temporally includes a play output segment followed by a mirror output segment on a still background (e.g., still output segment). FIGS. 11 and 12 depict the play output segment. A spatial region for the play output segment includes a person 1102. As shown, the person 1102 moves and extends her arms from frame 1100 to frame 1200, while a remainder of the spatial area remains static between frame 1100 and frame 1200.

Moreover, FIGS. 12-16 depict the mirror output segment. A spatial region for the mirror output segment includes a person 1104 and a person 1106. As depicted, the person 1104 and the person 1106 move closer and extend their arms from frame 1200 to frame 1300, and then embrace in frame 1400. Thereafter, the video reverses and the person 1104 and the person 1106 move apart in frame 1500, and then move farther apart and their arms lower from frame 1500 to frame 1600. Further, in frames 1200-1600 of FIGS. 12-16, a remainder of the spatial area remains static.

Figure 17:
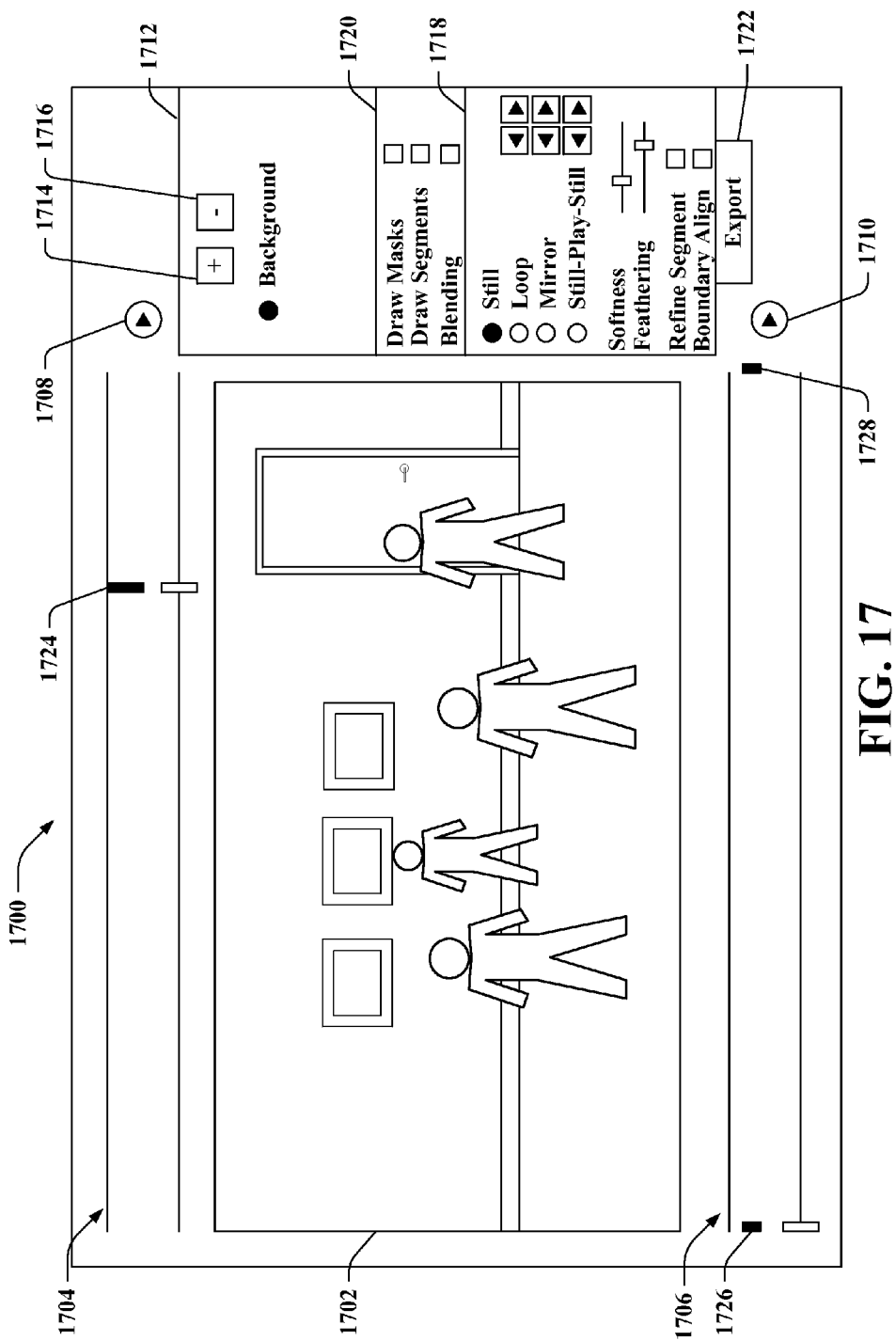
FIGS. 17-19 illustrate exemplary screenshots of a user interface that can be employed to juxtapose still and dynamic imagery from input video to generate a cliplet.
Figure 18:
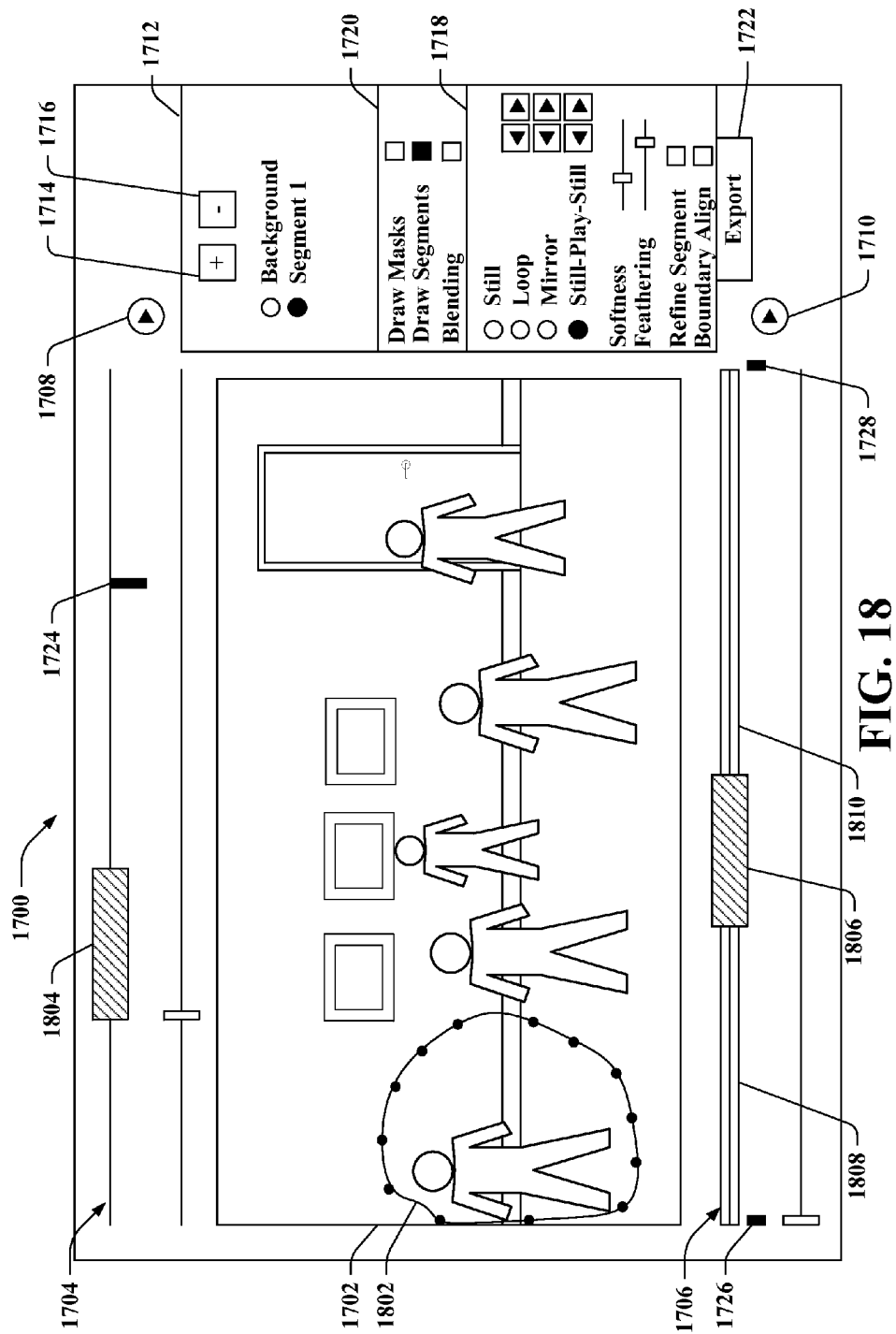
Figure 19:
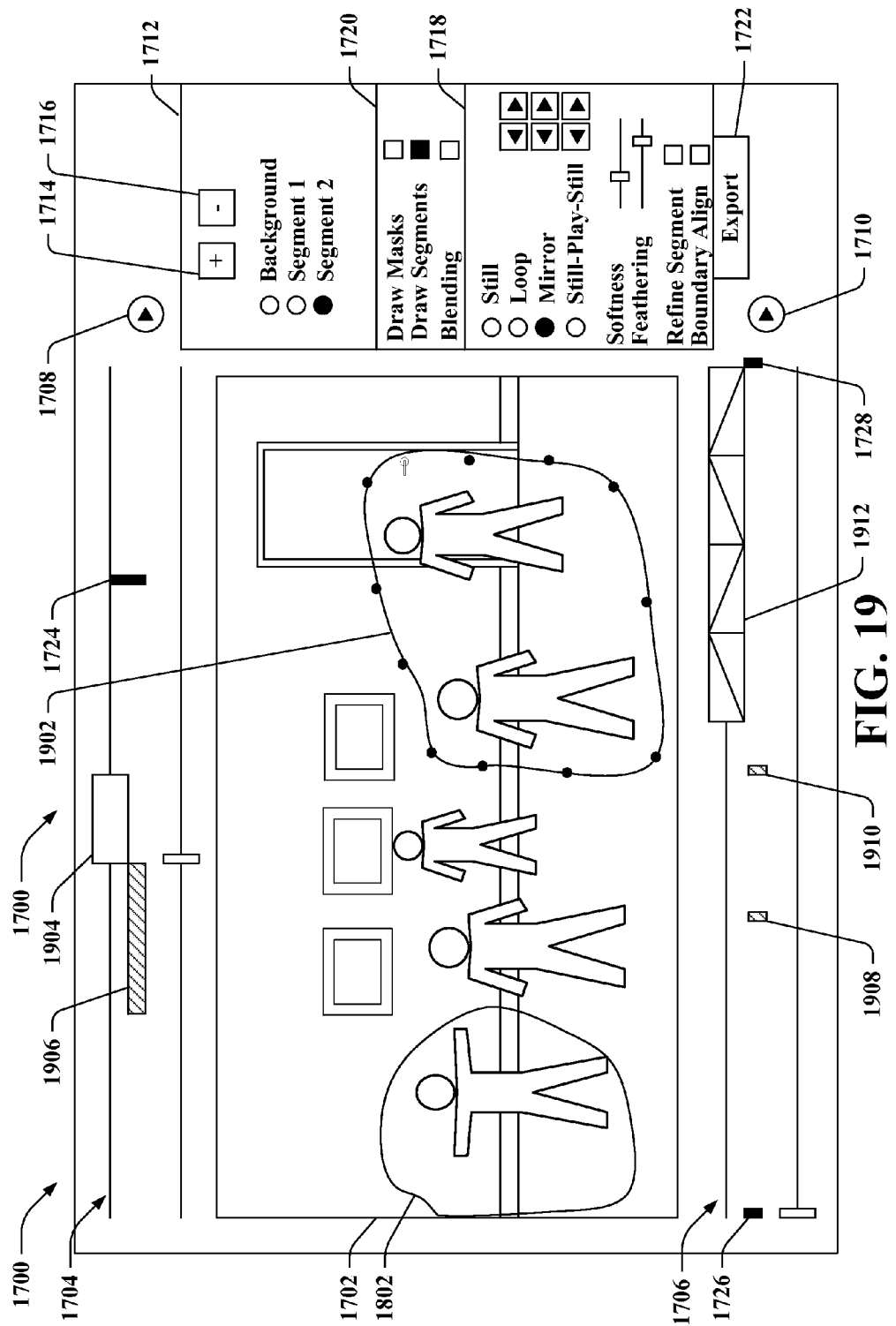

Now turning to FIGS. 17-19, illustrated are exemplary screenshots of a user interface 1700 that can be employed to juxtapose still and dynamic imagery from input video to generate a cliplet. More particularly, the screenshots of FIGS. 17-19 depict creation of the exemplary cliplet illustrated in FIGS. 11-16. The screenshots can be rendered on a display. These screenshots show three states of an exemplary cliplet creation session in which three segments are successively defined (e.g., background, segment 1, and segment 2). The user interface 1700 can enable a user to quickly define and render cliplets. For example, the user interface 1700 can be a graphical user interface (e.g., where user input can be received via a device such as a keyboard, mouse, etc.), a natural user interface (e.g., where gestures, touch, voice, etc. of a user can be employed as input), a combination thereof, and so forth. It is to be appreciated, however, that the example shown in FIGS. 17-19 is provided as an illustration of various aspects described herein, yet the claimed subject matter is not limited to such illustration.

With reference to FIG. 17, the user interface 1700 includes a main area 1702 that shows an input video and resulting cliplet. The main area 1702 is also used to define segment spatial boundaries (e.g., spatial regions of segments). Moreover, the user interface 1700 includes an input video timeline 1704 and an output cliplet timeline 1706. An input video play button 1708 is near the input video timeline 1704, and an output cliplet play button 1710 is near the output cliplet timeline 1706.

The user interface 1700 further includes a segment control panel 1712, which includes an add segment button 1714 and a remove segment button 1716. Under the add segment button 1714 and the remove segment button 1716, the segment control panel 1712 lists segment(s) (e.g., output segment(s)) currently defined for the cliplet, each with a corresponding radio button positioned adjacent thereto. As depicted in FIG. 17, a background segment is defined and a corresponding radio button for the background segment is selected. If it is desired to add another segment, the add segment button 1714 can be selected, and another segment would be listed in the segment control panel 1712 (e.g., segment 1 as shown in FIG. 18).

The user interface 1700 also includes a segment modification panel 1718. Controls in the segment modification panel 1718 can modify properties associated with a segment selected from the segment control panel 1712 (e.g., for a segment with a corresponding radio button selected). The segment modification panel 1718 includes buttons used to select a segment type (e.g., still, loop, mirror, or compound still-play-still). As depicted, the background is set to be a still segment. Moreover, the segment modification panel 1718 includes sliders and switches to adjust various refinements described herein. In the illustrated example, the segment modification panel 1718 includes a button to enable or disable local boundary alignment and a button to enable or disable segment boundary refinement. Further, the segment modification panel 1718 includes a slider to control temporal feathering and a slider to control softness (e.g., retiming of end-frames).

The user interface 1700 further includes a cliplet control panel 1720. The cliplet control panel 1720 includes a button to show or hide masks on the main area 1702, a button to show or hide segments on the main area 1702, and a button to enable or disable blending during compositing. Moreover, the user interface 1700 includes an export button 1722.

FIG. 17 shows a background defined for the cliplet. The background is a still segment. A start time within the input video from which an input segment that maps to the background is taken is indicated on the input video timeline 1704 as a black vertical bar 1724, which can be set by the user. This particular segment covers the full frame spatially, and also covers a full extent of the output cliplet timeline 1706 as shown by marker 1726 and marker 1728.

Referring now to FIG. 18, illustrated is a screenshot of the user interface 1700 when defining a still-play-still (SPS) compound segment, which can be three individual segments, laid consecutively in output time. A spatial region for the segment (e.g., segment 1) can be indicated by drawing a polygon 1802 within the main area 1702. The polygon 1802 can be a free form region that follows a mouse of a user, for instance. However, it is also contemplated that the polygon 1802 can snap to a feature in the image (e.g., person's face, body, etc.). An input temporal extent can be indicated by a bar 1804 on the input video timeline 1704. A user can drag the start or end times of the bar 1804 independently or can drag a center of the bar 1804 to shift the bar 1804 in time.

A bar 1806, similar to the bar 1804, is positioned and sized on the output cliplet timeline 1706. The bar 1806 indicates when this segment plays in the cliplet. Moreover, a bar 1808 to the left of the bar 1806 and a bar 1810 to the right of the bar 1806 on the output cliplet timeline 1706 are optionally turned on and off by the user. If both are off, segment 1 is simply a single play segment. If turned on as depicted, the first frame of segment 1 is held as a still before the play segment, and the last frame of segment 1 is held as a still after the play segment. A start time of the first still and an end time of the last still are also adjustable on the output cliplet timeline 1706; in the example shown, these times match the start time and end time of the cliplet.

Turning to FIG. 19, illustrated is a screenshot of the user interface 1700 when defining a mirror segment (e.g., segment 2). Again, a spatial region for the segment (e.g., segment 2) can be indicated by drawing a polygon 1902 within the main area 1702 and an input temporal extent can be indicated by a bar 1904 on the input video timeline 1704. An indicator 1906 for previously defined segment 1 is depicted below the input video timeline 1704. Moreover, marker 1908 and marker 1910 showing start and end times for previously defined segment 1 are below the output cliplet timeline 1706.

Moreover, a bar 1912 is positioned and sized on the output cliplet timeline 1706. The up-and-down triangle line in the bar 1912 indicates each loop instance played forward and backward in the mirror segment. A number of repetitions can be set by the user.

Although not shown, if segment 2 where changed from a mirror segment to a loop segment (e.g. by selecting the radio button for loop in the segment modification panel 1718), then the up-and-down triangle line in the bar 1912 would be replaced with a saw tooth line. Moreover, though not depicted, if the polygon 1902 and the polygon 1802 were overlapping, then segment 2 would be composited over segment 1.

Figure 20:
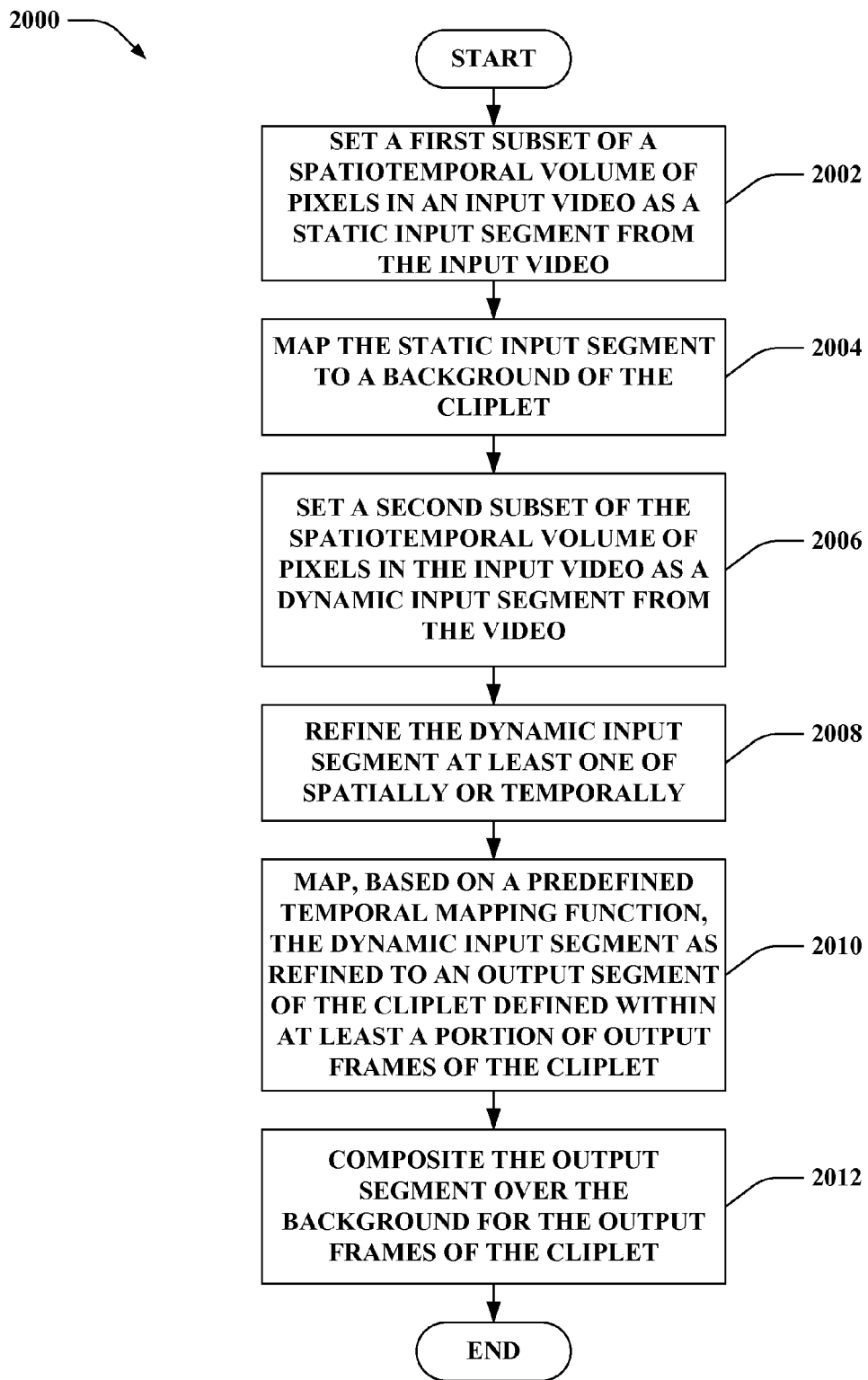
FIG. 20 is a flow diagram that illustrates an exemplary methodology of juxtaposing still and dynamic imagery to generate a cliplet.
Figure 21:
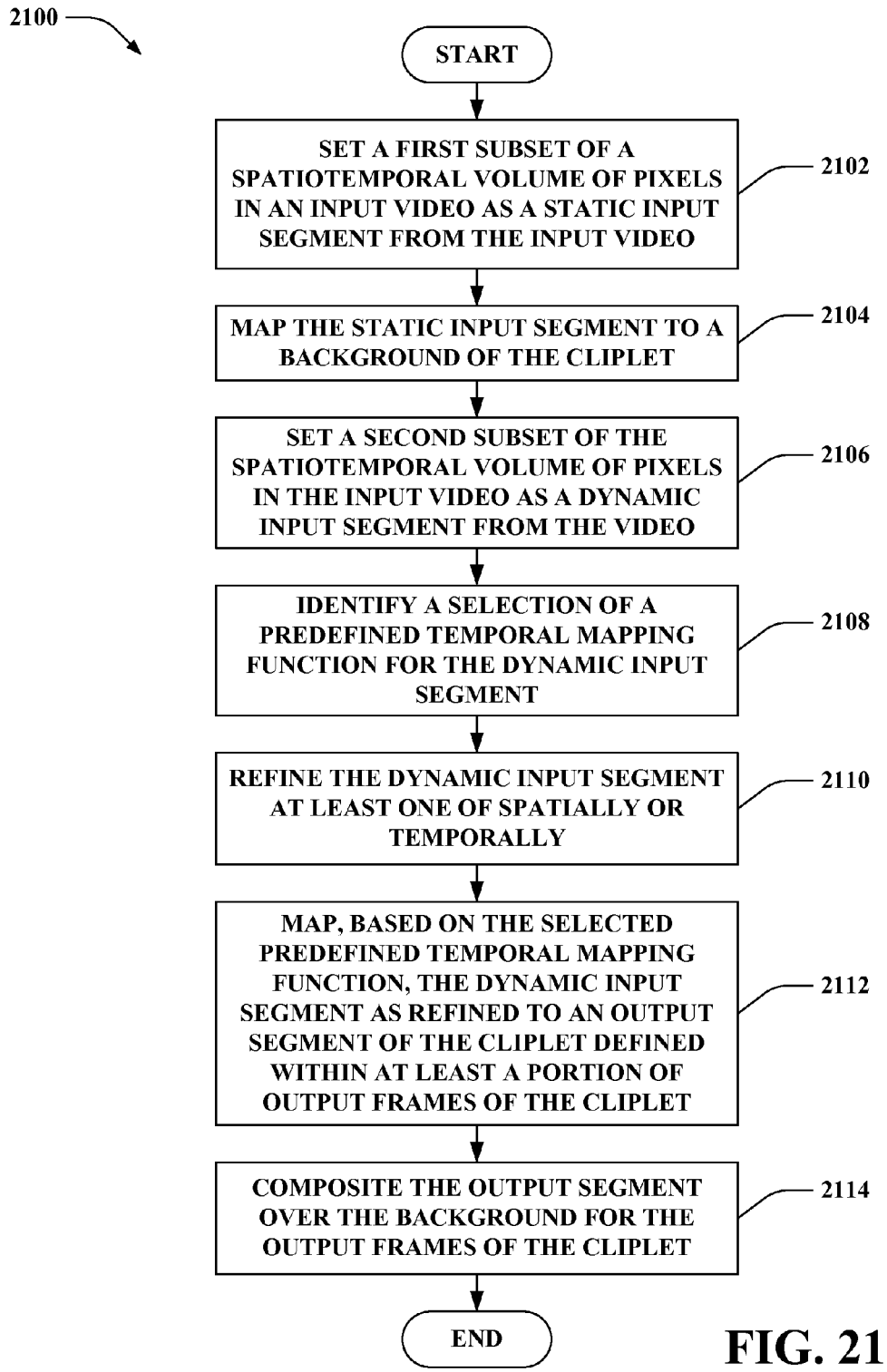
FIG. 21 is a flow diagram that illustrates an exemplary methodology of mitigating artifacts in a cliplet.

FIGS. 20-21 illustrate exemplary methodologies relating to creating cliplets. While the methodologies are shown and described as being a series of acts that are performed in a sequence, it is to be understood and appreciated that the methodologies are not limited by the order of the sequence. For example, some acts can occur in a different order than what is described herein. In addition, an act can occur concurrently with another act. Further, in some instances, not all acts may be required to implement a methodology described herein.

Moreover, the acts described herein may be computer-executable instructions that can be implemented by one or more processors and/or stored on a computer-readable medium or media. The computer-executable instructions can include a routine, a sub-routine, programs, a thread of execution, and/or the like. Still further, results of acts of the methodologies can be stored in a computer-readable medium, displayed on a display device, and/or the like.

FIG. 20 illustrates a methodology 2000 of juxtaposing still and dynamic imagery to generate a cliplet. At 2002, a first subset of a spatiotemporal volume of pixels in an input video can be set as a static input segment from the input video. At 2004, the static input segment can be mapped to a background of the cliplet. Further, the background can be repeated across output frames of the cliplet. At 2006, a second subset of the spatiotemporal volume of pixels in the input video can be set as a dynamic input segment from the input video. The dynamic input segment can be set based on a selection of a spatial region within the input video, a start time within the input video, and an end time within the input video. At 2008, the dynamic input segment can be refined at least one of spatially or temporally. At 2010, the dynamic input segment as refined can be mapped to an output segment of the cliplet defined within at least a portion of the output frames of the cliplet based on a predefined temporal mapping function. The predefined temporal mapping function can be one of a play temporal mapping function, a loop temporal mapping function, or a mirror temporal mapping function. At 2012, the output segment can be composited over the background for the output frames of the cliplet.

According to an example, a third subset of the spatiotemporal volume of pixels in the input video can be set as a second dynamic input segment from the input video. The second dynamic input segment can be set based on a selection of a second spatial region within the input video, a second start time within the input video, and a second end time within the input video. The second dynamic input segment can be refined at least one of spatially or temporally. Moreover, following this example, the second dynamic input segment as refined can be mapped to a second output segment of the cliplet defined within at least a second portion of the output frames of the cliplet based on a second predefined temporal mapping function. The second predefined temporal mapping function can be one of the play temporal mapping function, the loop temporal mapping function, or the mirror temporal mapping function. For instance, the predefined temporal mapping function and the second predefined temporal mapping function can be the same or can differ. Further, the second output segment can be composited over the output segment and the background for the output frames of the cliplet.

Turning to FIG. 21, illustrated is a methodology 2100 of mitigating artifacts in a cliplet. At 2102, a first subset of a spatiotemporal volume of pixels in an input video can be set as a static input segment from the input video. The static input segment can be set based on a selection of a time within the input video. At 2104, the static input segment can be mapped to a background of the cliplet. The background can be repeated across output frames of the cliplet. At 2106, a second subset of the spatiotemporal volume of pixels in the input video can be set as a dynamic input segment from the input video. The dynamic input segment can be set based on a selection of a spatial region within the input video, a start time within the input video, and an end time within the input video.

At 2108, a selection of a predefined temporal mapping function for the dynamic input segment can be identified. The predefined temporal mapping function can be selected from a set that comprises a play temporal mapping function, a loop temporal mapping function, and a mirror temporal mapping function. At 2110, the dynamic input segment can be refined at least one of spatially or temporally. At 2112, the dynamic input segment as refined can be mapped to an output segment of the cliplet defined within at least a portion of the output frames of the cliplet based on the selected predefined temporal mapping function. At 2112, the output segment can be composited over the background for the output frames of the cliplet.

Figure 22:
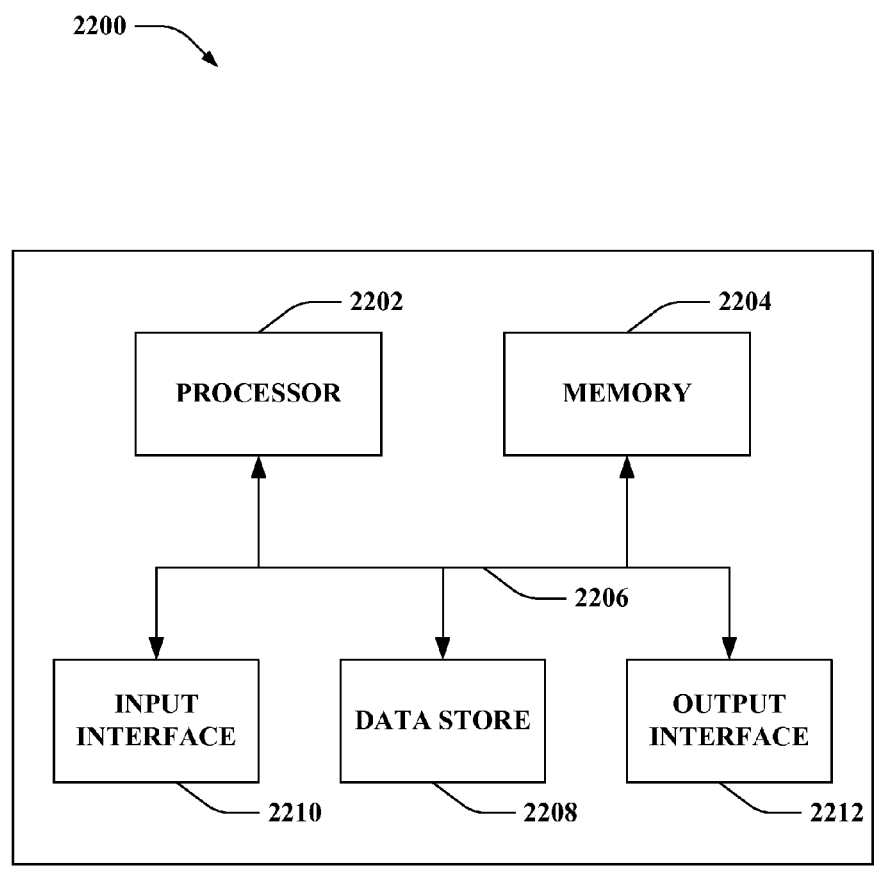
FIG. 22 illustrates an exemplary computing device.

Referring now to FIG. 22, a high-level illustration of an exemplary computing device 2200 that can be used in accordance with the systems and methodologies disclosed herein is illustrated. For instance, the computing device 2200 may be used in a system that creates cliplets from an input video. The computing device 2200 includes at least one processor 2202 that executes instructions that are stored in a memory 2204. The instructions may be, for instance, instructions for implementing functionality described as being carried out by one or more components discussed above or instructions for implementing one or more of the methods described above. The processor 2202 may access the memory 2204 by way of a system bus 2206. In addition to storing executable instructions, the memory 2204 may also store an input video, a cliplet, segment(s), and so forth.

The computing device 2200 additionally includes a data store 2208 that is accessible by the processor 2202 by way of the system bus 2206. The data store 2208 may include executable instructions, an input video, a cliplet, segment(s), etc. The computing device 2200 also includes an input interface 2210 that allows external devices to communicate with the computing device 2200. For instance, the input interface 2210 may be used to receive instructions from an external computer device, from a user, etc. The computing device 2200 also includes an output interface 2212 that interfaces the computing device 2200 with one or more external devices. For example, the computing device 2200 may display text, images, etc. by way of the output interface 2212.

Additionally, while illustrated as a single system, it is to be understood that the computing device 2200 may be a distributed system. Thus, for instance, several devices may be in communication by way of a network connection and may collectively perform tasks described as being performed by the computing device 2200.

As used herein, the terms "component" and "system" are intended to encompass computer-readable data storage that is configured with computer-executable instructions that cause certain functionality to be performed when executed by a processor. The computer-executable instructions may include a routine, a function, or the like. It is also to be understood that a component or system may be localized on a single device or distributed across several devices.

Further, as used herein, the term "exemplary" is intended to mean "serving as an illustration or example of something."

Various functions described herein can be implemented in hardware, software, or any combination thereof. If implemented in software, the functions can be stored on or transmitted over as one or more instructions or code on a computer-readable medium. Computer-readable media includes computer-readable storage media. A computer-readable storage media can be any available storage media that can be accessed by a computer. By way of example, and not limitation, such computer-readable storage media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and blu-ray disc (BD), where disks usually reproduce data magnetically and discs usually reproduce data optically with lasers. Further, a propagated signal is not included within the scope of computer-readable storage media. Computer-readable media also includes communication media including any medium that facilitates transfer of a computer program from one place to another. A connection, for instance, can be a communication medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio and microwave are included in the definition of communication medium. Combinations of the above should also be included within the scope of computer-readable media.

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the spirit and scope of the appended claims. Furthermore, to the extent that the term "includes" is used in either the details description or the claims, such term is intended to be inclusive in a manner similar to the term "comprising" as "comprising" is interpreted when employed as a transitional word in a claim.

What is claimed is:

1. A method of juxtaposing still and dynamic imagery to generate a cliplet, the method executed by a processor of a computing device, the method comprising:
   setting a first subset of a spatiotemporal volume of pixels in an input video as a static input segment;
   mapping the static input segment to a background of the cliplet, wherein the background is repeated across output frames of the cliplet;
   setting a second subset of the spatiotemporal volume of pixels in the input video as a dynamic input segment based on a selection of a spatial region within the input video, a start time within the input video, and an end time within the input video;
   refining the dynamic input segment, the refining further comprises at least one of:
      spatially refining the dynamic input segment based upon:
         a first region within the spatial region over a time interval from the start time to the end time, the first region being along a spatial boundary of the spatial region; and
         a second region within the static in input segment that abuts the spatial region; or
      temporally refining the dynamic input segment based upon:
         the spatial region in frames within a first temporal region of the dynamic input segment that includes the start time; and
         the spatial region in frames within a second temporal region of the dynamic input segment that includes the end time;
   mapping, based on a predefined temporal mapping function, the dynamic input segment as refined to an output segment of the cliplet defined within at least a portion of the output frames of the cliplet, wherein the predefined temporal mapping function is one of a play temporal mapping function, a loop temporal mapping function, or a mirror temporal mapping function; and
   compositing the output segment over the background for the output frames of the cliplet.

2. The method of claim 1, wherein the first subset of the spatiotemporal volume of pixels in the input video set as the static input segment includes pixels from a single frame of the input video.

3. The method of claim 1, wherein the static input segment is at least one of a panoramic image stitched from a pan in the input video or a clean plate image with one or more items removed from the input video.

4. The method of claim 1, further comprising pre-processing the input video prior to setting the static input segment and the dynamic input segment, the pre-processing globally aligns frames of the input video based on features included in the input video.

5. The method of claim 1, wherein spatially refining the dynamic input segment further comprises deforming the spatial region of the dynamic input segment over the time interval, the spatial region being deformed to minimize optical flow of pixels in the first region within the spatial region along the spatial boundary over the time interval, and align with the second region within the static input segment.

6. The method of claim 1, wherein the temporal mapping function is the loop temporal mapping function, the method further comprising:
  detecting a pair of frames from the input video where differences in pixel color and optical flow in the spatial region between the pair of frames are minimized; and
  at least one of:
    suggesting the pair of frames as the start time within the input video and the end time within the input video; or
    automatically selecting the pair of frames as the start time within the input video and the end time within the input video.

7. The method of claim 1, wherein temporally refining the dynamic input segment further comprises temporally feathering, using optical flow, the spatial region across the frames within the first temporal region that includes the start time and the frames within the second temporal region that includes the end time, wherein the predefined temporal mapping function is the loop temporal mapping function.

8. The method of claim 1, wherein the predefined mapping function is the mirror temporal mapping function, the method further comprising:
  detecting a first frame and a second frame from the input video where differences in optical flow in the spatial region between the first frame and frames temporally adjacent to the first frame and between the second frame and frames temporally adjacent to the second frame, respectively, are minimized; and
  at least one of:
    suggesting the first frame and the second frame as the start time within the input video and the end time within the input video; or
    automatically selecting the first frame and the second frame as the start time within the input video and the end time within the input video.

9. The method of claim 1, wherein temporally refining the dynamic input segment further comprises retiming the dynamic input segment to gradually slow the frames within the first temporal region towards the start time and the frames within the second temporal region towards the end time, wherein the predefined temporal mapping function is the mirror temporal mapping function.

10. The method of claim 1, wherein compositing the output segment over the background for the set of output frames of the cliplet further comprises spatially blending the output segment and the background.

11. The method of claim 1, further comprising:
  setting a third subset of the spatiotemporal volume of pixels in the input video as a second dynamic input segment based on a selection of a second spatial region within the input video, a second start time within the input video, and a second end time within the input video;
  refining the second dynamic input segment at least one of spatially or temporally;
  mapping, based on a second predefined temporal mapping function, the second dynamic input segment as refined to a second output segment of the cliplet defined within at least a second portion of the output frames of the cliplet, wherein the second predefined temporal mapping function is one of the play temporal mapping function, the loop temporal mapping function, or the mirror temporal mapping function; and
  compositing the second output segment over the output segment and the background for the output frames of the cliplet.

12. The method of claim 1, further comprising receiving input via a user interface, wherein the input identifies the predefined temporal mapping function, the spatial region within the input video, the start time within the input video, and the end time within the input video.

13. The method of claim 1, further comprising automatically generating a gallery of potential cliplets from the input video, wherein the potential cliplets are differing variations generated from the input video, and wherein the gallery includes the cliplet.

14. The method of claim 1, the computing device being a device that captures the input video.

15. A system that generates a cliplet from an input video, comprising:
  a processor; and
  a memory that comprises components that are executable by the processor, the components comprising:
    a segmentation component that sets respective subsets of a spatiotemporal volume of pixels in the input video as input segments based on selections of spatial regions within the input video, start times within the input video, and end times within the input video;
    a spatial refinement component that spatially refines a first input segment, the first input segment having a first spatial region and a time interval from a start time to an end time, the spatial refinement component deforms the first spatial region over the time interval to minimize optical flow of pixels in a portion of the first spatial region along a spatial boundary over the time interval and align with a portion of a second spatial region within a second input segment, the portion of the second spatial region abuts the portion of the first spatial region;
    a map component that maps the input segments as refined to output segments using a set of predefined temporal mapping functions, wherein each input segment is mapped using a corresponding predefined temporal mapping function selected for the input segment from the set of predefined temporal mapping functions, wherein the set of predefined temporal mapping functions comprises at least three of a still temporal mapping function, a play temporal mapping function, a loop temporal mapping function, or a mirror temporal mapping function; and
    a composite component that composites the cliplet from the output segments.

16. The system of claim 15, wherein the input video is an informally captured handheld video, and wherein the system is configured for execution by a device that captures the informally captured handheld video.

17. The system of claim 15, the components further comprising a temporal refinement component that temporally feathers, using optical flow, the first spatial region across frames within a first temporal region of the first input segment that includes the start time and frames within a second temporal region of the first input segment that includes the end time.

18. The system of claim 15, the components further comprising a loop detection component that suggests at least one of the start times and at least one of the end times corresponding to at least one of the input segments.

19. A computer-readable storage medium including computer-executable instructions that, when executed by a processor, cause the processor to perform acts including:
   setting a first subset of a spatiotemporal volume of pixels in an input video as a static input segment based on a selection of a time within the input video;
   mapping the static input segment to a background of a cliplet, wherein the background is repeated across output frames of the cliplet;
   setting a second subset of the spatiotemporal volume of pixels in the input video as a dynamic input segment based on a selection of a spatial region within the input video, a start time within the input video, and an end time within the input video;
   identifying a selection of a predefined temporal mapping function for the dynamic input segment, wherein the predefined temporal mapping function is selected from a set that comprises a play temporal mapping function, a loop temporal mapping function, and a mirror temporal mapping function;
   temporally refining the dynamic input segment based upon:
      the spatial region in frames within a first temporal region of the dynamic input segment that includes the start time; and
      the spatial region in frames within a second temporal region of the dynamic input segment that includes the end time;
   mapping, based on the selected predefined temporal mapping function, the dynamic input segment as refined to an output segment of the cliplet defined within at least a portion of the output frames of the cliplet; and
   compositing the output segment over the background for the output frames of the cliplet.

20. The computer-readable storage medium of claim 19, the computer-executable instructions, when executed by the processor, further cause the processor to perform acts including:
   spatially refining the dynamic input segment based upon:
      a first region within the spatial region over a time interval from the start time to the end time, the first region being along a spatial boundary of the spatial region; and
      a second region within the static input segment that abuts the spatial region.

* * * * *